US012626469B2

(12) United States Patent (10) Patent No.: US 12,626,469 B2
Kawamae et al. (45) Date of Patent: May 12, 2026

(54) 3D VIRTUAL-REALITY DISPLAY DEVICE, HEAD-MOUNTED DISPLAY, AND 3D VIRTUAL-REALITY DISPLAY METHOD

(71) Applicant: Maxell, Ltd., Kyoto (JP)

(72) Inventors: Osamu Kawamae, Kyoto (JP); Masuo Oku, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/022,745

(22) PCT Filed: Aug. 25, 2020

(86) PCT No.: PCT/JP2020/032034
§ 371 (c)(1),
(2) Date: Feb. 23, 2023

(87) PCT Pub. No.: WO2022/044124
PCT Pub. Date: Mar. 3, 2022

(65) Prior Publication Data
US 2023/0230333 A1 Jul. 20, 2023

(51) Int. Cl.
*G06T 19/20* (2011.01)
*G06T 15/10* (2011.01)
*G06T 19/00* (2011.01)

(52) U.S. Cl.
CPC .............. *G06T 19/20* (2013.01); *G06T 15/10* (2013.01); *G06T 19/006* (2013.01); *G06T 2210/62* (2013.01); *G06T 2219/2004* (2013.01)

(58) Field of Classification Search
CPC ....... G06T 19/006; G06T 15/10; G06T 19/20; G06T 2219/2004; G06T 2210/62; G06F 3/011
(Continued)

(56) References Cited

U.S. PATENT DOCUMENTS

| | | | |
|---|---|---|---|
| 2006/0044327 A1 | 3/2006 | Okuno et al. | |
| 2009/0128564 A1 | 5/2009 | Okuno | |
| | (Continued) | | |

FOREIGN PATENT DOCUMENTS

| | | | |
|---|---|---|---|
| JP | 2005-346468 A | 12/2005 | |
| JP | 2009-123018 A | 6/2009 | |
| | (Continued) | | |

OTHER PUBLICATIONS

Alhakamy AA, Tuceryan M. Real-time illumination and visual coherence for photorealistic augmented/mixed reality. ACM Computing Surveys (CSUR). May 28, 2020;53(3):1-34.*
(Continued)

*Primary Examiner* — Phu K Nguyen
(74) *Attorney, Agent, or Firm* — XSENSUS LLP

(57) ABSTRACT

A 3D-VR (virtual reality) display device comprises: a camera that takes an image of a real space and outputs a real object image of a real object included in the real space; a distance sensor that measures a distance from an observer of the real space to the real object; a display; and a processor that displays a 3D-VR object on the display, and the processor is configured to: when the real object is present on a line-of-sight of the observer who is observing the 3D-VR object, compare a distance from the observer to a position at which the 3D-VR object is being displayed with a distance from the observer to the real object; and when the real object is overlapping the 3D-VR object, perform overlapping elimination display processing of displaying the 3D-VR object on the line-of-sight while not displaying the real object image on the line-of-sight.

16 Claims, 20 Drawing Sheets

(58) Field of Classification Search
USPC ........................................................ 345/418
See application file for complete search history.

(56) References Cited

U.S. PATENT DOCUMENTS

| | | | |
|---|---|---|---|
| 2014/0300635 A1 | 10/2014 | Suzuki | |
| 2015/0070388 A1* | 3/2015 | Sheaffer | G02B 27/017 |
| | | | 345/633 |
| 2016/0260261 A1* | 9/2016 | Hsu | B23K 9/32 |
| 2017/0200310 A1* | 7/2017 | Kapinos | G06T 15/20 |
| 2017/0206692 A1* | 7/2017 | Sheaffer | G02B 27/0093 |
| 2019/0066380 A1 | 2/2019 | Berk et al. | |
| 2020/0027276 A1 | 1/2020 | Meier et al. | |
| 2020/0090401 A1 | 3/2020 | Terrano | |
| 2020/0128231 A1* | 4/2020 | Pace | G02B 27/0172 |
| 2020/0211295 A1* | 7/2020 | Skidmore | G06F 3/011 |
| 2022/0044483 A1 | 2/2022 | Shiokawa et al. | |
| 2023/0031913 A1* | 2/2023 | Ishikawa | G06T 19/006 |

FOREIGN PATENT DOCUMENTS

| | | |
|---|---|---|
| JP | 2013-101528 A | 5/2013 |
| JP | 2015-87909 A | 5/2015 |
| JP | 2016-122392 A | 7/2016 |
| JP | 2016122392 * | 7/2016 |
| JP | 2018005005 A | 1/2018 |
| WO | 2020115784 A1 | 6/2020 |
| WO | 2020121483 A1 | 6/2020 |

OTHER PUBLICATIONS

Zhan T, Yin K, Xiong J, He Z, Wu ST. Augmented reality and virtual reality displays: perspectives and challenges. Iscience. Aug. 21, 2020;23(8).*

Bell B, Feiner S, Hollerer T. View management for virtual and augmented reality. InProceedings of the 14th annual ACM symposium on User interface software and technology Nov. 11, 2001 (pp. 101-110).*

International Search Report and Written Opinion mailed on Nov. 24, 2020, received for PCT Application PCT/JP2020/032034, filed on Aug. 25, 2020, 8 pages including English Translation.

Office Action issued Jun. 3, 2025, to the corresponding Japanese patent application No. 2024-124597, 10pp.

Extended European search report issued Apr. 2, 2024, to corresponding European patent application No. 20951378.7, 8pp.

Communication pursuant to Article 94(3) EPC issued Nov. 19, 2025, to corresponding European patent application No. 20951378.7, 6 pp.

* cited by examiner

AREA

AREA

AREA

| CONTENS ID | 550e8400-e29b-41d4-a716-446655440000 |
|---|---|
| CONTENT Set | Car Inside |
| AR Object 1 | Data id= xxxx.yyyy.zzzz.1368 |
| | Title = Dashboard |
| | Occlusion Flag = 01 |
| | 3D Image Data |
| AR Object 2 | Data id= xxxx.yyyy.xyz.1114 |
| | Title = Handle |
| | Occlusion Flag = 01 |
| | 3D Image Data |
| ⋮ | ⋮ |
| AR Object 7 | Data id= abcz.yyyy.xyz.8012 |
| | Title = Front window |
| | Occlusion Flag = 10 |
| | 3D Image Data |
| ⋮ | ⋮ |

3D VIRTUAL-REALITY DISPLAY DEVICE, HEAD-MOUNTED DISPLAY, AND 3D VIRTUAL-REALITY DISPLAY METHOD

CROSS-REFERENCE TO RELATED APPLICATION

The present application is based on PCT filing PCT/JP2020/032034, filed Aug. 25, 2020, the entire contents of which are incorporated herein by reference.

TECHNICAL FIELD

The present invention relates to a 3D virtual reality display device, a head-mounted display, and a 3D virtual reality display method, and more particularly, to a technology used for experiencing Mixed Reality (MR) including a real space and a virtual reality object (AR object: Argument Reality Object).

BACKGROUND ART

Patent Literature 1 discloses a technique in which "an information processing device that outputs a composite image obtained by compositing a real space image and a virtual object image to a display device identifies a position of a real object, determines whether the real object is moving based on information on the identified position of the real object, and outputs the composite image so as to cause the display device to display the composite image in a manner allowing the presence or absence of the real object to be recognized when the real object is moving (excerpted from Abstract)".

CITATION LIST

Patent Literature

Patent Literature 1: JP-A-2016-122392

SUMMARY OF INVENTION

Technical Problem

In Patent Literature 1, in the case where a 3D AR object and a real object of a real space overlap each other on a line of sight from an HMD, the appearance of displaying the 3D AR object is restricted, for example, by causing the 3D AR object to be displayed semi-transparently or not displaying the 3D AR object near the real object. This may cause difficulty in accurately recognizing the 3D AR object and experiencing MR.

The present invention has been made in view of the problem above, and an object of the present invention is to provide a technology capable of realizing more accurate recognition of a 3D AR object.

Solution to Problem

In order to solve the problem above, the present invention includes the features recited in the scope of claims. One of the aspects thereof is a 3D virtual reality display device, comprising: a camera that takes an image of a real space and outputs a real object image of a real object included in the real space; a distance sensor that measures a distance from an observer of the real space to the real object; a display; and a processor that displays a 3D virtual reality object on the display; the processor being configured to: when the real object is on a line of sight of the observer who is observing the 3D virtual reality object, compare a distance from the observer to a position at which the 3D virtual reality object is being displayed with a distance from the observer to the real object; and when the real object is overlapping the 3D virtual reality object, perform overlapping elimination display processing of displaying the 3D virtual reality object on the line of sight while not displaying the real object image on the line of sight.

Advantageous Effects of Invention

According to the present invention, it is possible to realize more accurate recognition of a 3D AR object. The problems, configurations, and advantageous effects other than those described above will be clarified by explanation of the embodiments below.

BRIEF DESCRIPTION OF DRAWINGS

FIG. 13 illustrates a 3D AR object table.

DESCRIPTION OF EMBODIMENTS

Figure 1:
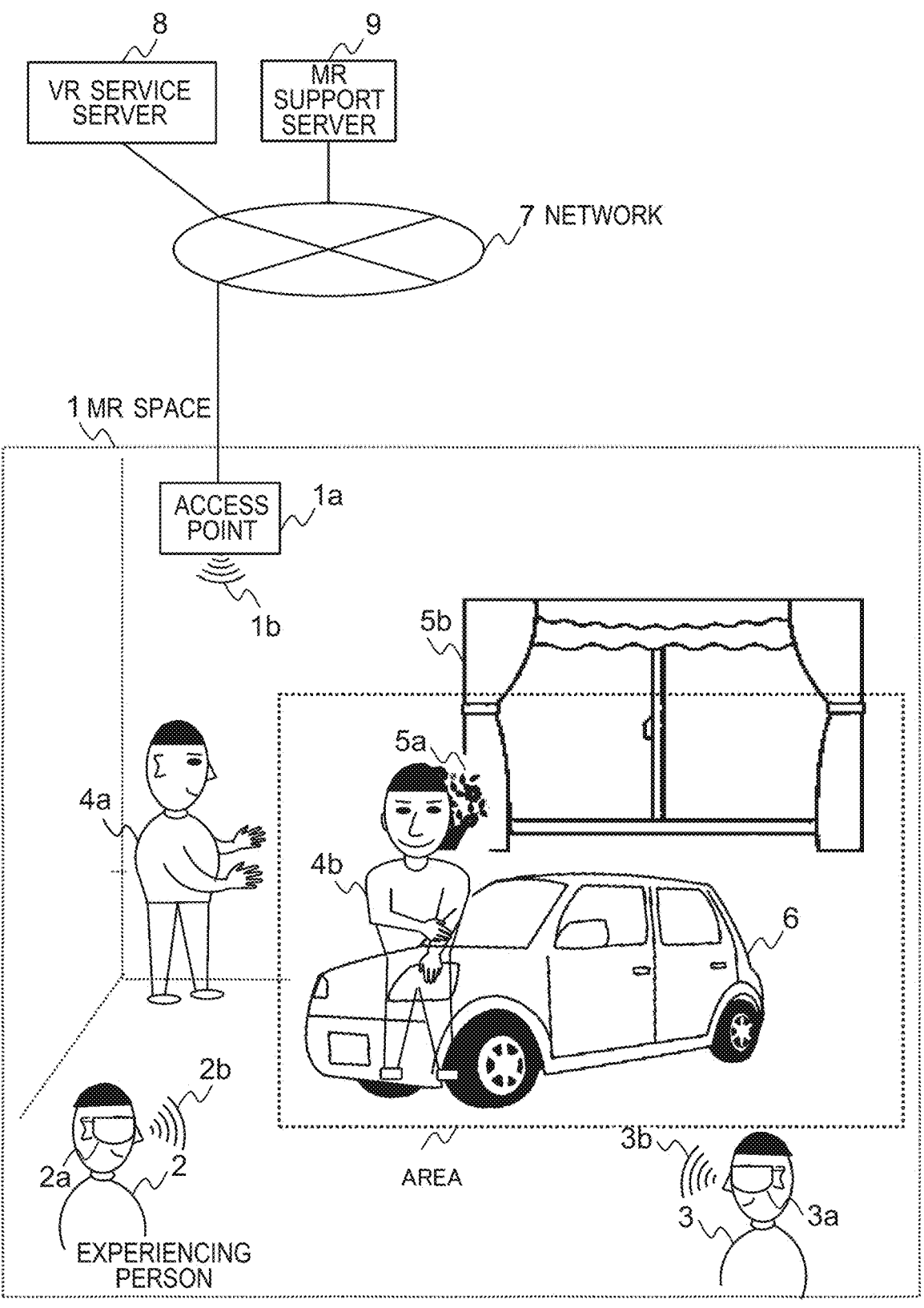
FIG. 1 is a schematic diagram of a 3D virtual reality display system according to a first embodiment.

Hereinafter, embodiments of the present invention will be describes with reference to the drawings. Throughout all the drawings, the common elements and steps are provided with the same reference signs, and are not described in detailed repetitively.

In the present embodiment, a 3D virtual reality object (hereinafter, referred to as a "3D AR object", and in the drawings, referred to as a "3D-ARO") created by computer graphics (CG) is composited on a 3D real space image (hereinafter, referred to as a "real space image") obtained by taking images of a real space using a ranging camera, and the image thus composited is displayed. In the present embodiment, a camera and a distance sensor for measuring a distance are integrally configured by using a ranging camera 20, however the camera and a separate distance sensor such as an ultrasonic range finder may be combined and used.

In superimposing a 3D AR object on a 3D real space image obtained by taking an image of a real space and displaying the image thus composited, an image to be displayed far from a viewpoint has a shielded area due to an image to be displayed close to the viewpoint. As an image processing method for expressing the shielded area, occlusion has been known.

An image of a mixed reality (MR) space obtained by compositing an AR image on an image of a background of a real space is used for contents such as games, maintenance work, and sales promotion. For compositing an AR image, for example, an image of a subject called an AR marker is taken based on the real space image, and then an AR image associated with the AR marker is superimposed on an area of the subject. There are often the cases that, as hardware for displaying 3D virtual reality, an HMD (head-mounted display) integrating a camera and a display is used, and accordingly, hereinafter, an embodiment for implementing the present invention in HMDs will be described.

First Embodiment

A first embodiment will be described with reference to FIG. 1 to FIG. 9.
(Configuration of 3D Virtual Reality Display System)

FIG. 1 is a schematic diagram of a 3D virtual reality display system according to the first embodiment.

FIG. 1 illustrates that an MR experiencing person 2 is wearing an HMD 2*a* on the head and viewing an MR space 1. Similarly, an MR experiencing person 3 is wearing an HMD 3*a* on the head and viewing the MR space 1.

The HMDs 2*a*, 3*a* transmit and receive wireless LAN signals 1*b*, 2*b*, 3*b* to and from an access point 1*a* so as to be connected thereto, respectively, and establish wireless communication.

The access point 1*a* is placed in the MR space 1, and connected to a network 7 outside the MR space 1 so as to cause the HMDs 2*a*, 3*a* to communicate with a VR service server 8 and MR support server 9 located on the network 7, respectively. Here, VR (Virtual Reality) means a virtual reality space.

The real space includes MR non-experiencing persons 4*a*, 4*b*. The real space also includes a vase 5*a* and a window 5*b* as portions of the background of the real space. A 3D AR object 6 is a 3D AR object of a car.

The MR space 1 is a space intended to be used for sales promotion of cars. The MR space 1 is not limited for use by one particular MR experiencing person, but may provide a plurality of persons, such as the MR experiencing persons 2, 3, with simultaneous MR experiences. The MR experiencing person 3 may be a promoter who is explaining a product while observing the same 3D AR object 6 that the MR experiencing person 2 is also observing from a different orientation, or may be another visitor who is observing a 3D AR object different from the 3D AR object 6 that the MR experiencing person 2 is observing. The promoter has only to present a car to be sold as the 3D AR object 6, but does not have to display an expensive real object (car), nor prepare a large space for displaying a plurality of cars. In addition to the MR experiencing persons 2, 3, the MR space 1 may include visitors such as MR non-experiencing persons 4*a*, 4*b*. The MR non-experiencing persons 4*a*, 4*b* may be family members of the MR experiencing persons 2, 3 visitors who are standing by for an MR experience, and the like.

The MR non-experiencing persons 4*a*, 4*b* are not observing the 3D AR object 6, and can freely move in the MR space 1. This may cause a situation in which, for example, the MR non-experiencing person 4*b* is at the same position of the 3D AR object 6.

Figure 2:
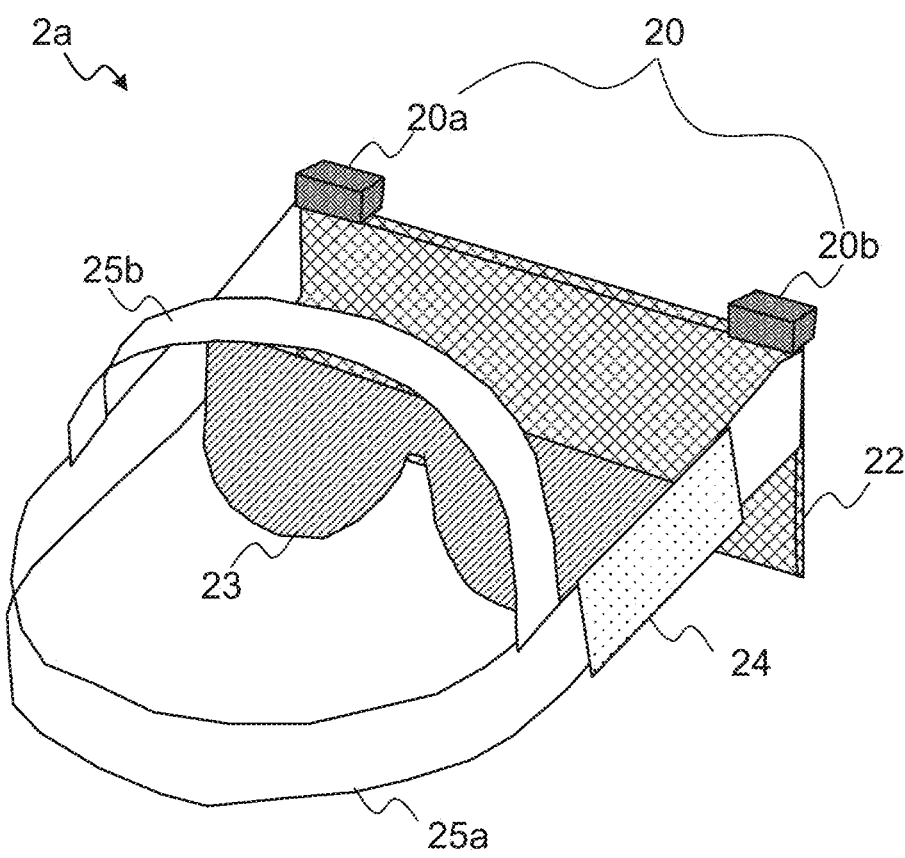
FIG. 2 illustrates appearance of an HMD which is an example of a 3D virtual reality display device.

FIG. 2 illustrates appearance of each of the HMDs 2*a*, 3*a*, which are examples of a 3D virtual reality display device. The HMD 2*a* is a video see-through HMD. The HMD 3*a* has the same configuration as that of the HMD 2*a*, and thus the configuration thereof will not be described herein. The HMD 2*a* includes the ranging camera 20 with parallax and a display 22. The HMD 2*a* takes an image of the foreground using the ranging camera 20, composites the 3D AR object 6 drawn by CD or the like on the image taken by the ranging camera 20, displays the composite image on the display 22 arranged in front of the MR experiencing person 2.

The ranging camera 20 includes a left camera 20*a* and a right camera 20*b*, and measures a distance to an object which is being taken. The display 22 is a flat display, and is provided with a shutter 23 inside thereof. A left-eye image and a right-eye image are alternately displayed on the display 22, and the shutter 23 is opened and closed in synchronization therewith That is, when an image for the left eye is displayed, the left half of the display 22 is opened and the right half is closed, and when an image for the right eye is displayed, the left half of the display 22 is closed and the right half is opened. This enables 3D display in the HMD 2*a*. The MR experiencing person 2 views the displayed image alternately with only one of the eyes in synchronization with the displayed image.

The HMD 2*a* further includes a processor 24 and wearing housings 25*a*, 25*b*. The HMD 2*a* is worn to the head via the wearing housings 25*a*, 25*b*.

The display 22 displays a real space image of the front taken by the left camera 20*a* and right camera 20*b*, and the MR experiencing person 2 views the displayed real space image. Furthermore, the display 22 displays the 3D AR object 6 superimposed on the real space image. At this time, on the display 22, displaying the image taken by the left camera 20*a* on which an image of an AR object for the left eye is superimposed and displaying the image taken by the right camera 20b on which an image of an AR object for the right eye is superimposed causes the 3D AR object 6 to be displayed stereographically (three-dimensionally) as if it was at a predetermined distance in the real space.

In displaying by the HMD 2a, the front and rear relation of distances of the real objects of the real space, for example, the MR non-experiencing person 4b, vase 5a, and window 5b illustrated in FIG. 1, and the 3D AR object 6 are reflected. For example, in the relation in which a portion of a real object (MR non-experiencing person 4b) is front of a portion of the 3D AR object 6, the occlusion processing is performed to process the drawing data on the 3D AR object 6 so as to make the portion of the 3D AR object 6 appear hidden by the portion of the real object (MR non-experiencing person 4b).
(Block Diagram of 3D Virtual Reality Display Device)

Figure 3:
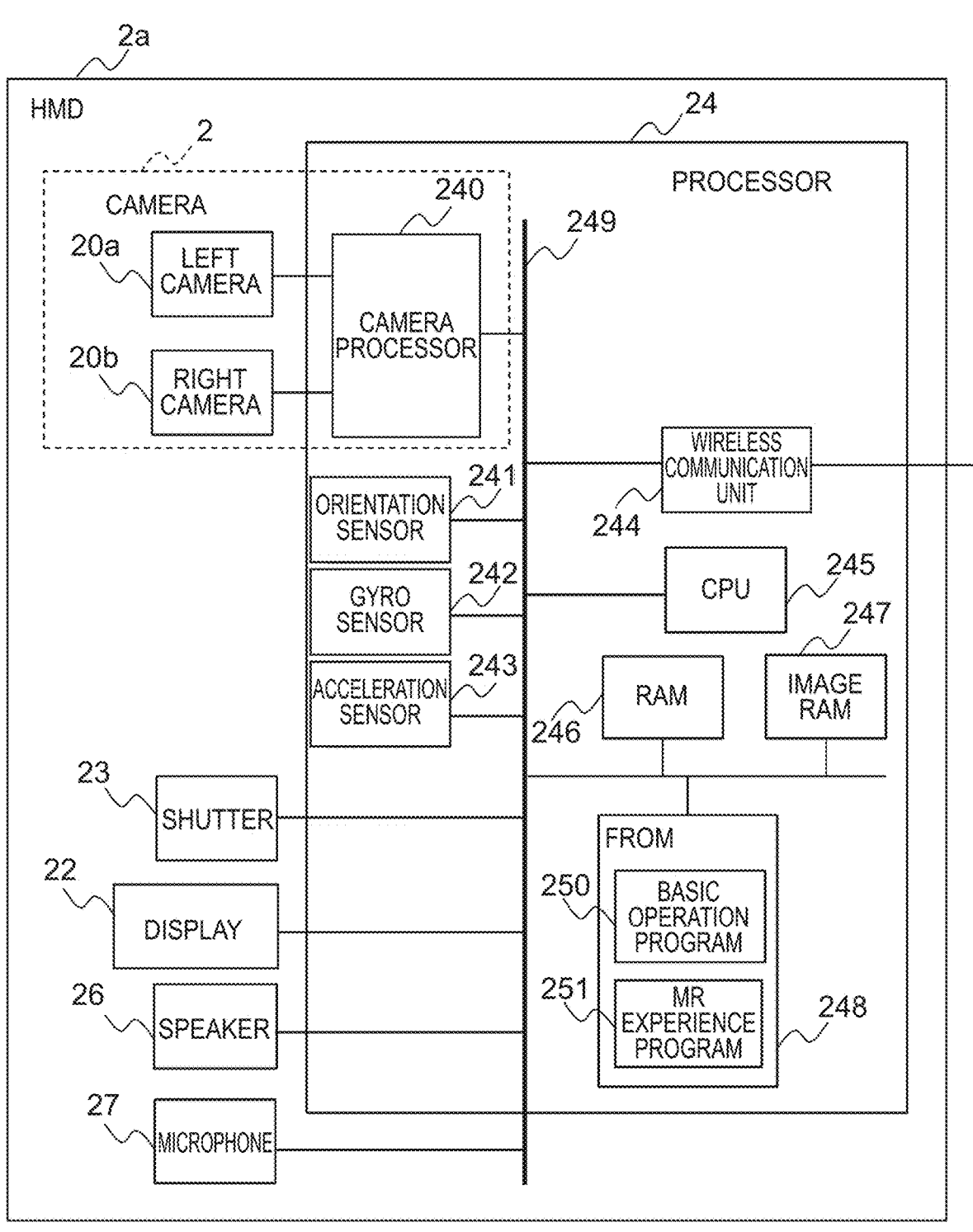
FIG. 3 is a block diagram of an HMD.

FIG. 3 is a block diagram of the HMD 2a. In FIG. 3, the components common to those illustrated in FIG. 2 are provided with the same reference signs. In FIG. 3, the processor 24 is surrounded by a solid line, and connected to the left camera 20a, the right camera 20b, the display 22, the shutter 23, a speaker 26, and a microphone 27.

The processor 24 includes a camera processor 240, an orientation sensor 241, a gyro sensor 242, an acceleration sensor 243, a wireless communication unit 244, a CPU 245 (corresponding to a main processor), a RAM 246, an image RAM 247, a Flash ROM (FROM) 248, and an internal bus 249. These elements above are connected to each other via the internal bus 249.

The wireless communication unit 244 selects the appropriate processing from among several kinds of communication processing, for example, mobile communication such as 4G and 5G, wireless LAN, and the like, and connects the HMD 2a to the network 7 via the access point 1a.

The FROM 248 includes a basic program 250 and an MR experience program 251. The CPU 245 loads these processing programs onto the RAM 246 and then executes them. Furthermore, the FROM 248 retains data necessary for execution of the processing programs. The FROM 248 may be a nonvolatile medium other than the Flash ROM.

The CPU 245 stores image data to be output to the display 22 in the image RAM 247, and then reads out the image data.

The camera processor 240 executes the processing for calculating a distance to a subject (corresponding to a real object) of the real space image based on the images taken by the left camera 20a and the right camera 20b, and adds, to the real space image, data on the distance to the subject of the real space image. In the present description, the "real space image" refers to only an image, while data to which the distance data is added is referred to as "real space image data".

The group of sensors including, for example, the orientation sensor 241, the gyro sensor 242, and the acceleration sensor 243 is used to obtain the position of the HMD 2a and the photographing direction of the ranging camera 20 (used as a line of sight of the MR experiencing person 2 who is wearing the HMD 2a).

The HMD 2a may include some or all of the processing executed by the VR service server 8 and MR support server 9, which will be described below.

Figure 4:
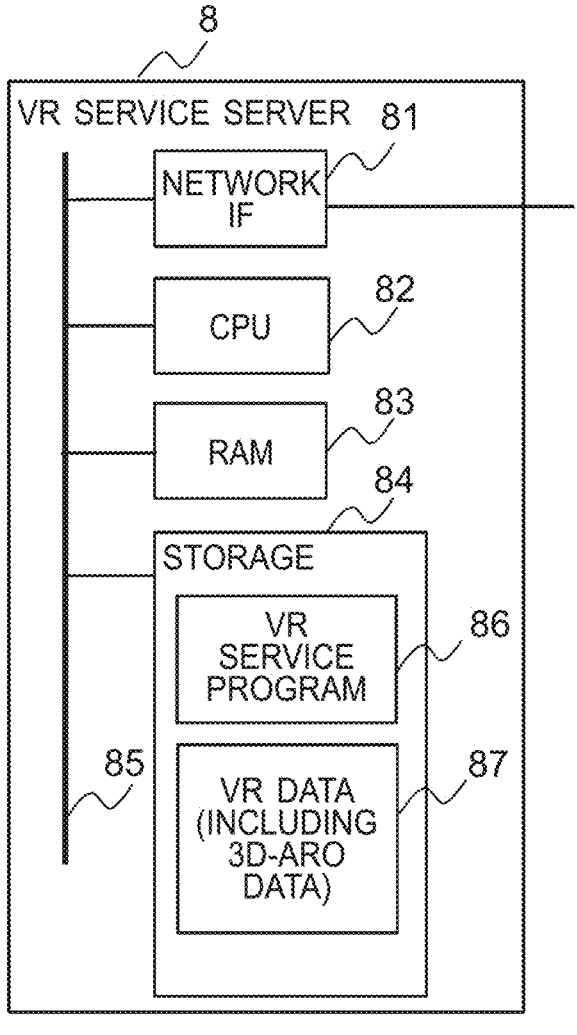
FIG. 4 is a block diagram of a VR service server.

FIG. 4 is a block diagram of the VR service server 8. The VR service server 8 includes a network interface (network IF) 81 for a wired LAN or the like, a CPU 82, a RAM 83, and storage 84, and these are connected to each other via an internal bus 85.

The storage 84 may be the one with which a hard disk drive or the like is combined, other than Flash ROM. The storage 84 retains a VR service program 86. The CPU 82 loads the VR service program 86 onto the RAM 83 and executes it.

The storage 84 further retains VR data 87 such as a 3D AR object and the like. The VR data 87 is data necessary for execution of the VR service program 86.

The VR data 87 may also include, in addition to the 3D AR object, VR (Virtual Reality) image data. The VR image data is an image used for replacing the entire real space image of the MR experiencing persons 2, 3. Replacement with the VR image data enables the MR experiencing persons 2, 3 to experience observation of the 3D AR object 6 while feeling as if they were in another space given by the VR image data.

Figure 5:
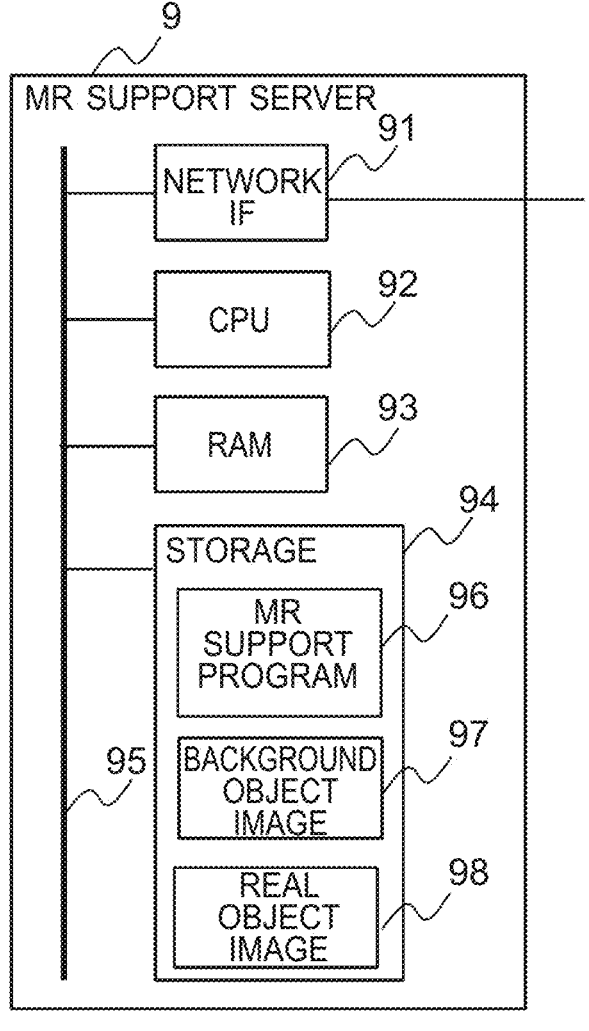
FIG. 5 is a block diagram of an MR support server.

FIG. 5 is a block diagram of the MR support server 9. The MR support server 9 includes a network IF 91 for a wired LAN or the like, a CPU 92, a RAM 93, and a storage 94, which are connected to each other via an internal bus 95.

The storage 94 may be the one with which a hard disk drive or the like is combined, other than the Flash ROM. The storage 94 includes an MR support program 96 as a processing program. The CPU 92 loads the MR support program 96 onto the RAM 93 and then executes it.

The storage 94 further retains a background object image 97 and a real object image 98, which are data necessary for execution of the MR support program 96.

The background object image 97 and the real object image 98 are data used for an MR experience by a user in experiencing MR by a plurality of users, data separated for each of the users is provided.

The real object image 98 is data obtained by detecting an area in which motion is found based on time difference or the like from the real space image received from the HMD 2a and recognizing one grouped area as a real object. Based on the shape of the real object or the like, what the real object is, for example, whether the real object is a person may be detected.

The background object image 97 is data on a background image obtained by removing an area of the real object from the real space image, and is data on an area where no motion is found in the real space image. In the area of the real object which has been removed, among the real space images obtained back in time, data when the real object has not appeared in the area is interpolated, whereby the background image is obtained. More specifically, since the background object image 97 is on the rear side of the real object image 98, at a certain point in time, that is, in a plurality of same frames (target frame) of the 3D real space image, an image of the background object that is further behind the real object image 98 is not taken. The MR support program 96 recognizes the real object image 98 in the target frame and extracts the background object image 97 from the other frames in which the real object is not reflected, thereby generating the background object image 97.
(Image by 3D Virtual Reality Display)

Figure 6A:
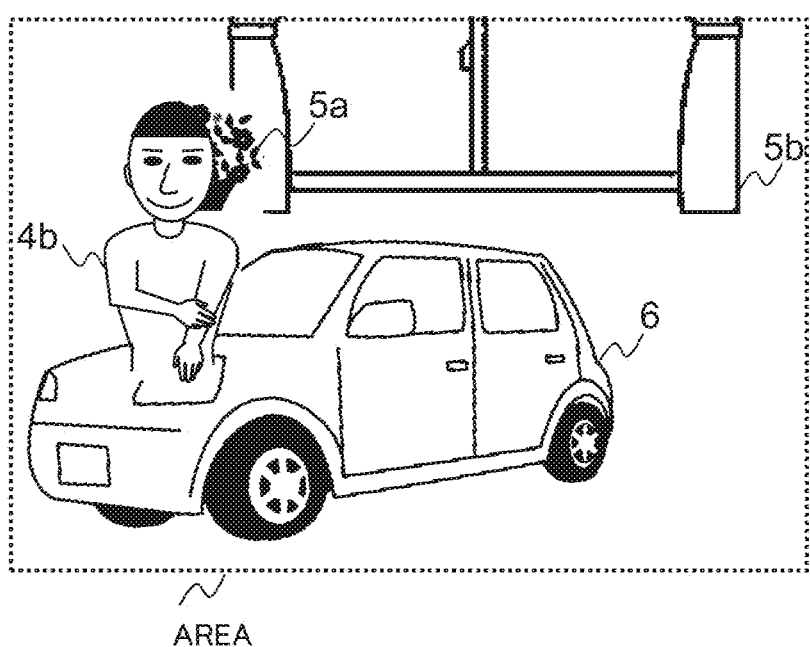
FIG. 6A illustrates an example of conventional 3D virtual reality display (illustrating a state in which a 3D AR object and a real object are overlapping each other).
Figure 6B:
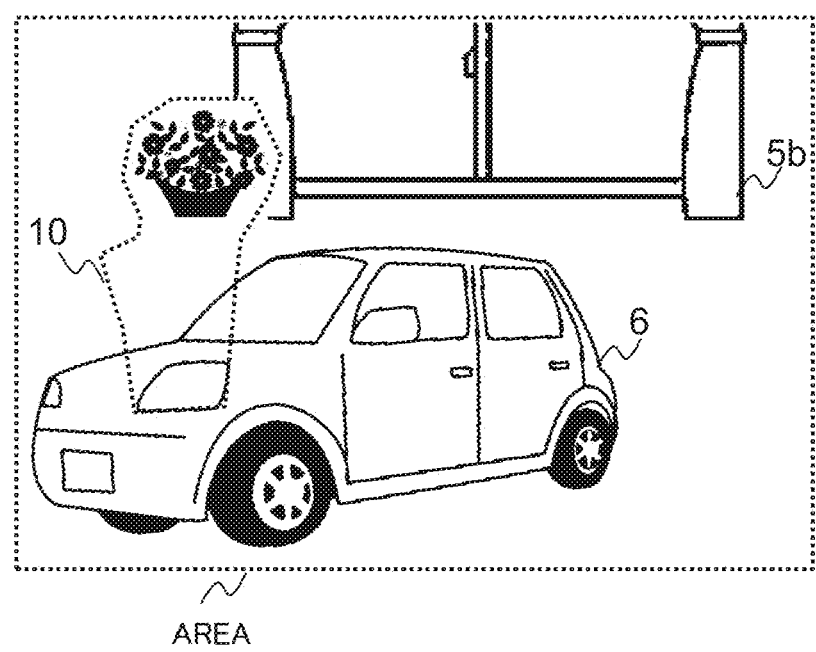
FIG. 6B illustrates 3D virtual reality display (example of first overlapping elimination display) according to the first embodiment.
Figure 6C:
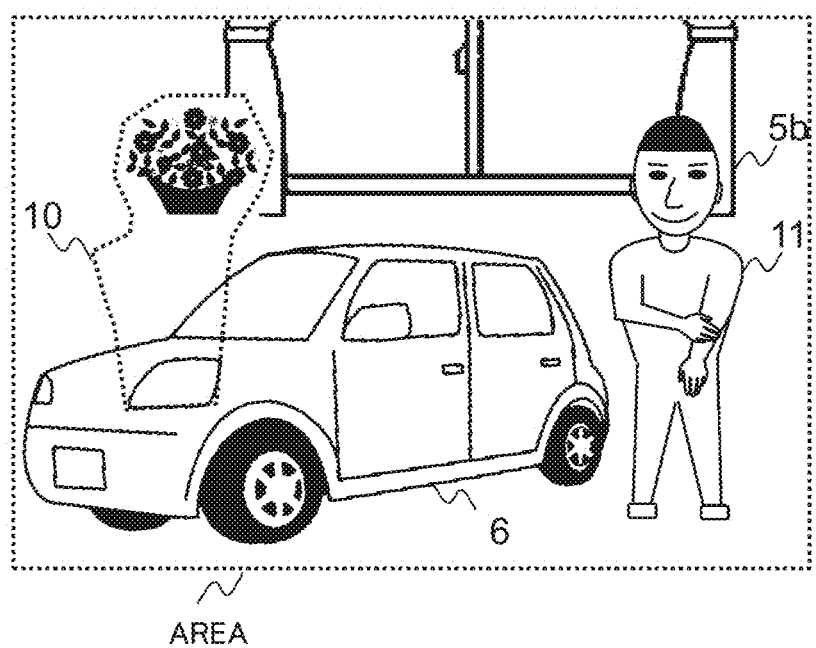
FIG. 6C illustrates 3D virtual reality display (example of second overlapping elimination display) according to the first embodiment.
Figure 6D:
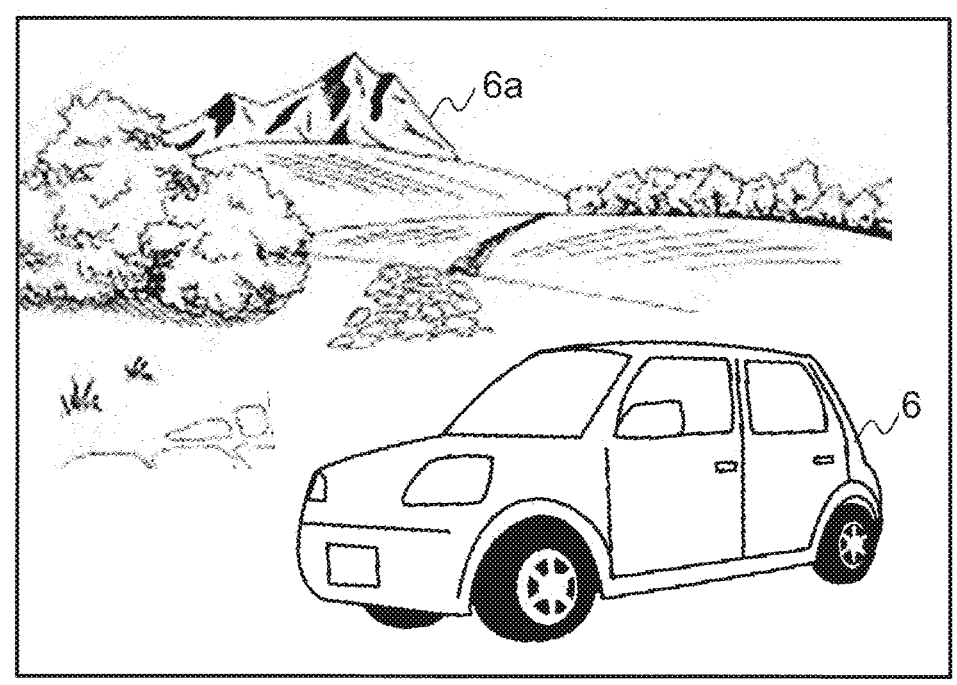
FIG. 6D illustrates 3D virtual reality display (example of third overlapping elimination display) according to the first embodiment.

FIG. 6A to FIG. 6D are diagrams for explaining a 3D virtual reality display method. FIG. 6A illustrates an example of the conventional 3D virtual reality display (illustrating an example in which the 3D AR object and the real object are overlapping each other), FIG. 6B illustrates the 3D virtual reality display (example of first overlapping elimination display) according to the first embodiment, FIG. 6C illustrates the 3D virtual reality display (example of second overlapping elimination display) according to the first embodiment, and FIG. 6D illustrates the 3D virtual reality display (example of third overlapping elimination display) according to the first embodiment. Each of FIG. 6A to FIG. 6C is illustrated to correspond to the area (AREA) surrounded by a dashed line in FIG. 1. As illustrated in FIG. 1, the MR non-experiencing person 4*b* that is a real object and the 3D AR object 6 are located at almost the same positions in view of relation of the distances, and are overlapping each other on the line of sight of the HMD 2*a*. The "relation of distances" referred herein is the relation of distances starting from the HMD 2*a* on the direction same as that of a line-of-sight of the MR experiencing person 2 who is a wearer of the HMD 2*a*. The "relation of distances" does not include relation of distances in the direction different from that of the lire-of-sight direction even if the distances from the MR experiencing person 2 are the same.

FIG. 6A illustrates an image obtained by having performed occlusion between the MR non-experiencing person 4*b* (real object) and the 3D AR object 6 which are overlapping each other. The upper portion of the MR non-experiencing person 4*b*, which is in front of the 3D AR object 6, is being displayed, however, the lower portion of the MR non-experiencing person 4*b*, which is behind the 3D AR object 6, is not being displayed. This results in an unnatural image in which the non-experiencing person 4*b* is appearing from the 3D AR object 6 (as if the person's upper body was on the hood of the car or growing therefrom), and thus causes the presence of the MR non-experiencing person 4*b* to hinder the recognition of the 3D AR object 6. For avoiding such unnaturalness, in the present embodiment, the processing illustrated in FIG. 6B or FIG. 6C is performed.

In FIG. 6B and FIG. 6C, occlusion is not executed between the real object (MR non-experiencing person 4*b*) and the 3D AR object 6 which are at almost the same positions in view of the distances. Instead, a background object image 10 obtained by cutting out from the background image is inserted into the area of the real object (MR non-experiencing person 4*b*), and occlusion is performed between the background object image 10 and the 3D AR object 6. In normal cases, the background object image 10 is located at a distance farther on the same line of sight than the 3D AR object 6, and thus the 3D MR object 6 can be displayed without being lacked, and also a background (for example, the vase 5*a*) which has been hidden by the real object (MR non-experiencing person 4*b*) can also be displayed. This can realize a natural MR experience. The above is the processing illustrated in FIG. 6B (first overlapping elimination display).

In FIG. 6C, in addition, to FIG. 6B, an image of the real object (MR non-experiencing person 4*b*) is moved (put off) to a location that does not hinder the recognition of the 3D AR object 6 (second overlapping elimination display). An image 11 illustrated in FIG. 6C corresponds to the real object (MR non-experiencing 4*b*) after being moved. According to this processing, in the where a real object (MR non-experiencing person 4*b*) is the one who should be paid attention to at all times, for example, a child of the MR experiencing persons 2, 3, the 3D AR object 6 and the real object (MR non-experiencing person 4*b*) are displayed so as to be visually recognized simultaneously without the real object being hidden, and also the image displayed thereby is not unnatural like the one processed by occlusion. This can maintain the immersive MR experience. Here, when moving the real object (MR non-experiencing person 4*b*), the distances on the same line of sight from the MR experiencing person 2 may differ such as far or near, and in such a case, reducing or enlarging the scale of the real object (MR non-experiencing person 4*b*) in accordance with the distances from the MR experiencing person 2 enables visual recognition of the object in a natural size.

FIG. 6D illustrates an example of replacing a real space image with VR image data 6*a* (example of third overlapping elimination display). In the case where the VR image data 6*a* is on the back of the 3D AR object 6, the 3D AR object 6 is displayed against the background of the VR image data 6*a*. Depending on the situations of car sales promotion, switching from the video of FIG. 6B or FIG. 6C to the display as illustrated in FIG. 6D enables a video in which various backgrounds and the 3D AR object 6 are combined to be displayed. This allows an experiencing person to visually recognize the 3D AR object 6 in various scenes. In switching from the video of FIG. 6B or FIG. 6C to the background video of FIG. 6D, the video may be gradually composited and varied, or processing such as a wipe may be performed. (Flowchart)

Figure 7A:
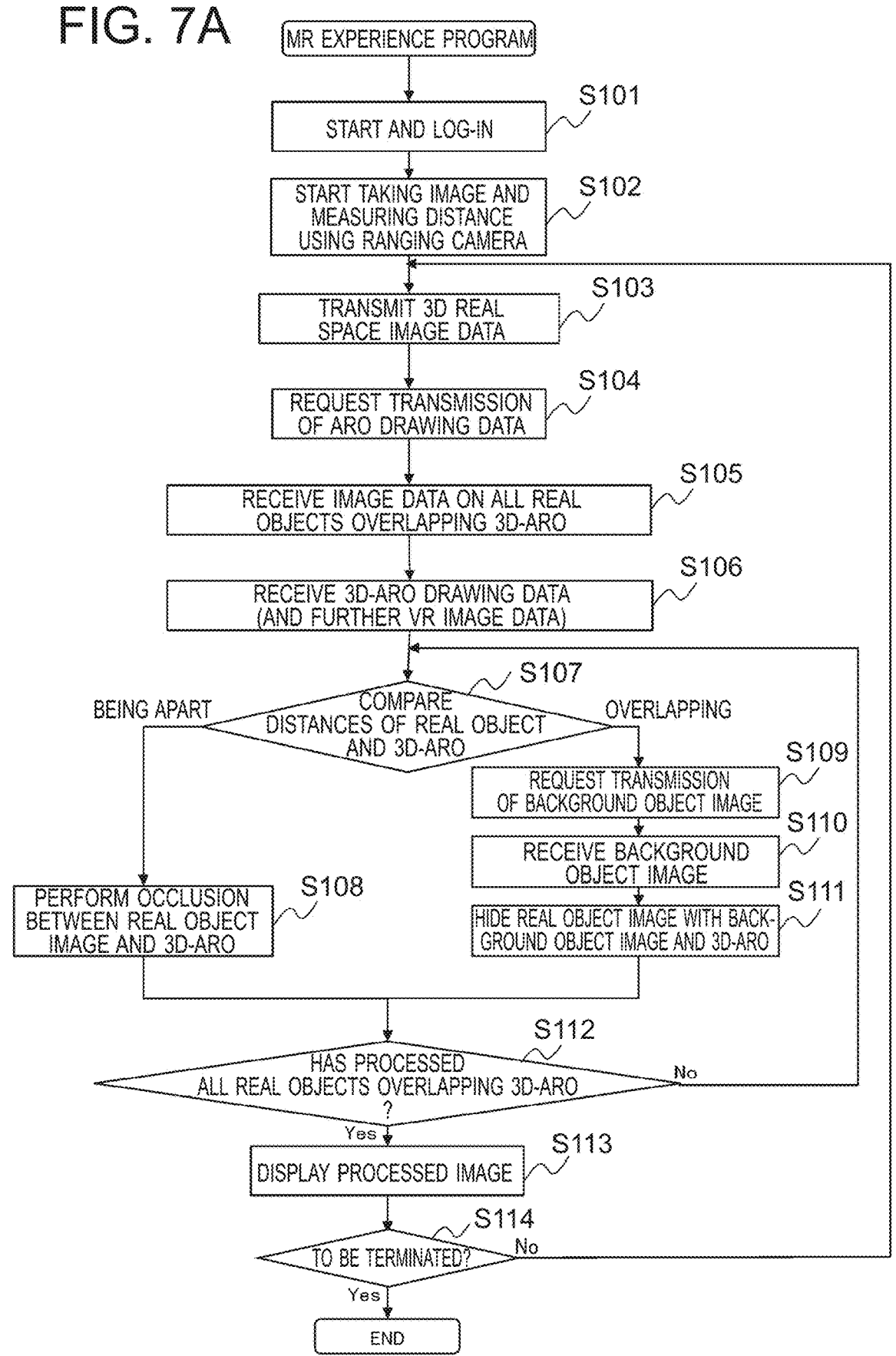
FIG. 7A illustrates a flowchart of an MR experience program according to the first embodiment.

FIG. 7A illustrates a flowchart of the MR experience program 251 according to the first embodiment. The MR experiencing person 2 starts the MR experience program 251 stored in the HMD 2*a* (step S101) and logs-in to the VR service server 8 and the MR support server 9. Hereinafter, operations during execution of the MR experience program 251 by the HMD 2*a* will be described in order of steps. In the following, the processing in the case where the MR non-experiencing person 4*b* as a real object overlaps or does not overlap the 3D AR object 6 of a car will be exemplified.

The HMD 2*a* starts taking images (step S102). The images taken by the ranging camera 20 are provided with data on a distance to a real object. Taking images may be performed by taking a motion video, for example, at 30 fps (frame per second) so as to generate 3D real space image data in which multiple frames are arranged in time series and capturing the image taken thereby. The subsequent steps may be performed in synchronization with camera-photographing cycles.

The HMD 2*a* transmits 3D real space image data to the MR support server 9 via the wireless communication unit 244 (step S103). As will be described later, the MR support server 9 separates an image of a real object (MR non-experiencing person 4*b*) and an image of a background object (for example, vase 5*a*, window 5*b*) from the real space image.

Furthermore, the HMD 2*a* transmits, to the VR service server 8, a request to transmit drawing data (included in the VR data 87) on the 3D AR object 6 (step S104).

The HMD 2*a* receives, from the MR support server 9, data on at least one or more, preferably all the real object images (including the images of the real object and the distance data thereof) extracted from the real space image (step S105), and receives, from the VR service server 8, the drawing data on the 3D AR object (in the present embodiment, 3D AR object 6) and VR image data (step S106).

The HMD 2*a* compares three-dimensional overlapping between each real object (MR non-experiencing person 4*b*) and the 3D AR object 6, in other words, a distance from the HMD 2*a* to the real object image (including an image of the MR non-experiencing person 4*b* and data on a distance thereto) and a distance from the HMD 2*a* to the 3D AR object 6, starting from the HMD 2*a* and on the same line of sight.

In the case where the real object and the three-dimensional 3D AR object 6 are at the same distance on the same line of sight, the volume of the real object and that of the 3D AR object are overlapping each other. In this state, if performing the occlusion without considering the overlapping of the volumes, for example, the occlusion is successful for the front side of the 3D AR object 6 and the surface of the real object, however, in the depth side of the 3D AR object 6, the occlusion cannot be appropriately processed for the relation of distances with the surface of the real object. This causes unnatural display as if the real object was suddenly appearing from the 3D AR object 6.

In the present embodiment, the HMD 2a selects execution of the conventional occlusion processing or overlapping elimination display processing in accordance with the level of the overlapping between the volume of the real object and that of the 3D AR object 6.

In the case of a distance that the volume of the real object does not overlap the volume of the 3D AR object 6 (step S107: being apart), the HMD 2a performs the occlusion processing for the real object and the 33D AR object (step S108).

On the other hand, in the case of a distance that the volume of the real object (MIR non-experiencing person 4b) overlaps the volume of the 3D AR object (step S107: overlapping), the HMD 2a performs the overlapping elimination display processing.

Figure 7B:
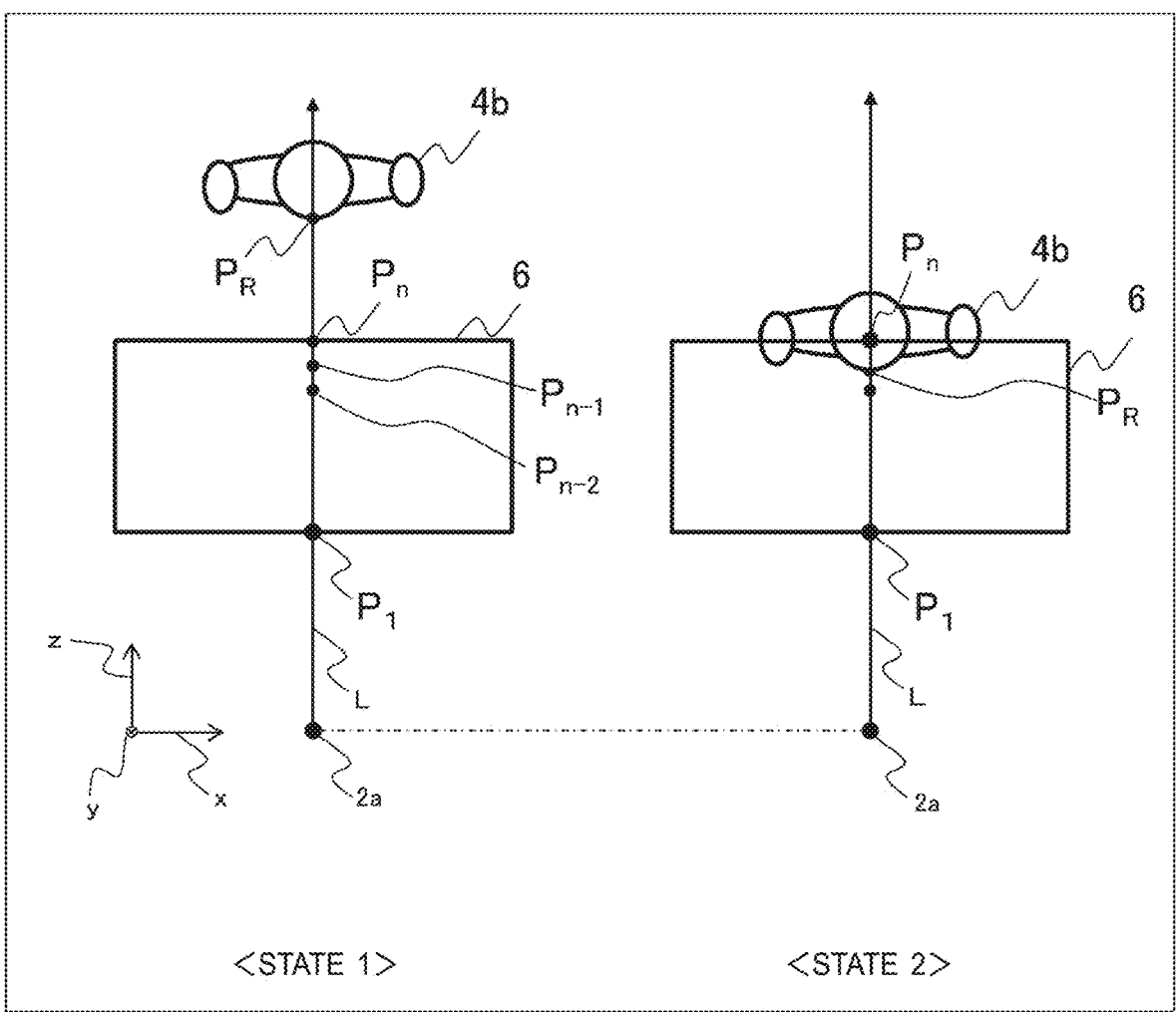
FIG. 7B illustrates an example of a determination algorithm for the level of overlapping of volumes.

Referring to FIG. 7B, an example of a determination algorithm in step S107 will be described. FIG. 7B illustrates an exemplary algorithm for determining the level of overlapping of the volumes. For convenience of explanation, a display surface of the HMD 2a is assumed to be a surface parallel to the vertical direction. Where one point on the display 22, for example, the upper left corner of the display 22 is set as an origin, 3D coordinates of reality are defined using the x-y plane of 2D coordinates of the screen and the z-axis orthogonal thereto. The z-x plane is the horizontal plane and the z-axis represents a distance in the depth direction of the line of sight as viewed from the HMD 2a.

In the example illustrated in FIG. 7B, when the real object is located in front of the HMD 2a, a value of the z axis corresponds to a distance from the HMD 2a to the MR non-experiencing person 4b. Since the MR non-experiencing person 4b is visually recognized using the ranging camera 20, a position $P_R$ $(x_R, z_R)$ of the MR non-experiencing person 4b on a line of sight L from an observer can be expressed by an intersection point between a surface of the MR non-experiencing person 4b which faces the HMD 2a and the line of sight L.

On the other hand, the shape of the 3D AR object 6 is assumed to be defined using three-axes coordinates of (s, t, u) of a 3D image system. Upon appearance of an AR marker in the real space, the 3D AR object 6 is superimposed thereon and displayed. Where the origin $(s_0, t_0, u_0)$ of the 3D AR object 6 is superimposed on 3D coordinates $(x_l, y_m, z_n)$ of the AR marker, $(s_0, t_0, u_0)$ can be converted into $(x_l, y_m, z_n)$. For convenience of explanation, it is assumed that there is no deviation in the rotational direction of the respective axes between the stu-coordinate system and the xyz-coordinate system and the s-axis corresponds to the x-axis, the t axis corresponds to the y-axis, and the u-axis corresponds to the z-axis.

If there is only one point configuring the 3D AR object 6 on the line of sight L of the HMD 2a, the processor 24 selects the point as a farthest point $P_n$, while if there is a plurality of points such as $P_1, \ldots, P_{n-2}, P_{n-1}, P_n$, the processor 24 selects, as the farthest point $P_n$, a point farthest from the HMD 2a, that is, a point having the largest z-axis value. Note that a point $P_1$ having the smallest z-axis value is the closest point.

Then, the processor 24 compares the 3D coordinates $(x_R, y_R, z_R)$ of the intersection point PR between the line of sight L and the MR non-experiencing person 4b with the coordinates $(x_{ARn}, y_{ARn}, z_{ARn})$ of the farthest point $P_n$ of the 3D AR object 6 (in the present embodiment, $x_R = x_{ARn}$, $y_R = y_{ARn}$).

When $z_R > z_{ARn}$, the processor 24 determines that there is no overlapping of the volumes between the real object and the 3D AR object 6 (State 1). When $z_R \leq z_{ARn}$, the processor 24 determines that there is overlapping of the volumes between the real object and the 3D AR object 6 (State 2).

Then, the HMD 2a makes a request of transmission of data about a background object image (corresponding to the background object image 10 in FIG. 6B) corresponding to an area of the real object (MR non-experiencing person 4b) to the MR support server 9 (step S109), and receives the data (step S110). After receiving the data, the HMD 2a hides the real object (MR non-experiencing person 4b) with the background object image 10 and the 3D AR object 6 (first overlapping elimination display). Furthermore, the HMD 2a cuts out the real object (MR non-experiencing person 4b) and displays it at a location that does not overlap the 3D AR object 6, and inserts the background object image 10 into the area where the real object (MR non-experiencing person 4b) is actually present (second overlapping elimination display).

In the case of having received the VR image data on the background together with the drawing data on the 3D AR object 6 in step S106, the HMD 2a replaces the background object image within the real object with the VR image in steps S107 and S108, and performs the occlusion processing for the VR image of the background, the 3D AR object, and the real object, and the composition processing such as moving the real object. Here, in this example, the HMD 2a performs the processing of compositing the images displayed on the HMD 2a, however, a subject of performing the composition processing is not limited thereto, and a server connected via a network, a smart phone or tablet linked and connected, or the like, as will be described later, may perform the processing.

The HMD 2a confirms whether the steps S107 to S111 have been performed for all the real objects that overlap the 3D AR object 6, and if any real object remains unprocessed, the HMD 2a returns to step S107 (step S112: No). On the other hand, if all the real objects have been already processed (step S112: Yes), the HMD 2a displays the processed images on the display 22 of the HMD 2a (step S113).

If the MR experience program 251 by the HMD 2a has not been terminated, the HMD 2a continues the steps from step S103 in the next camera cycle (step S114: No). Upon termination of the MR experience program 251 by the HMD 2a (step S114: Yes), the HMD 2a ends the processing above.

Figure 8:
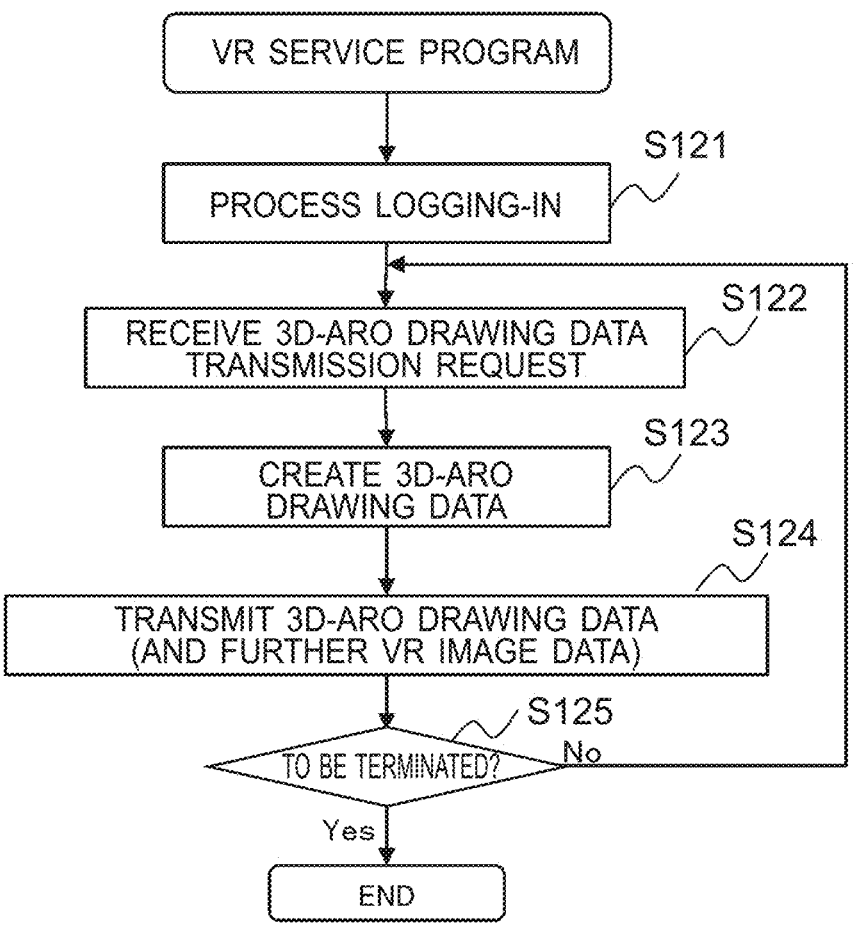
FIG. 8 illustrates a flowchart of a VR service server according to the first embodiment.

FIG. 8 illustrates a flowchart of the VR service program 86. Upon receiving the log-in request from the registered MR experiencing person 2, the VR service server 8 executes log-in processing (step S121).

Upon receiving the request to transmit the drawing data on the 3D AR object 6 from the HMD 2a (step S122), the VR service server 8 creates the requested drawing data on the 3D AR object (step S123). The drawing data on the 3D AR object is data (object file) obtained by three-dimensionally drawing the 3D AR object 6 in accordance with, for example, the distance between the HMD 2a and the 3D AR object and the line-of-sight direction of the HMD 2a, which are included in the transmission request of the drawing data on the 3D AR object. The drawing data is updated as the HMD 2a moves and the line-of-sight changes. The drawing data may additionally include, as images, influences of reflection and shadows based on a direction of a light source such as the sun or illumination.

The VR service server 8 transmits the created drawing data to the HMD 2a (step S124).

The VR service server 8 continues the processes from steps S122 to S124 until a termination condition of the VR service program 86, for example, logging-out by the MR experiencing person 2 or termination of the MR experience program 251, is satisfied (step S125: No).

Upon satisfaction of the termination condition of the VR service program 86 (step S125: Yes), the VR service server 8 ends the series of processes described above.

Figure 9:
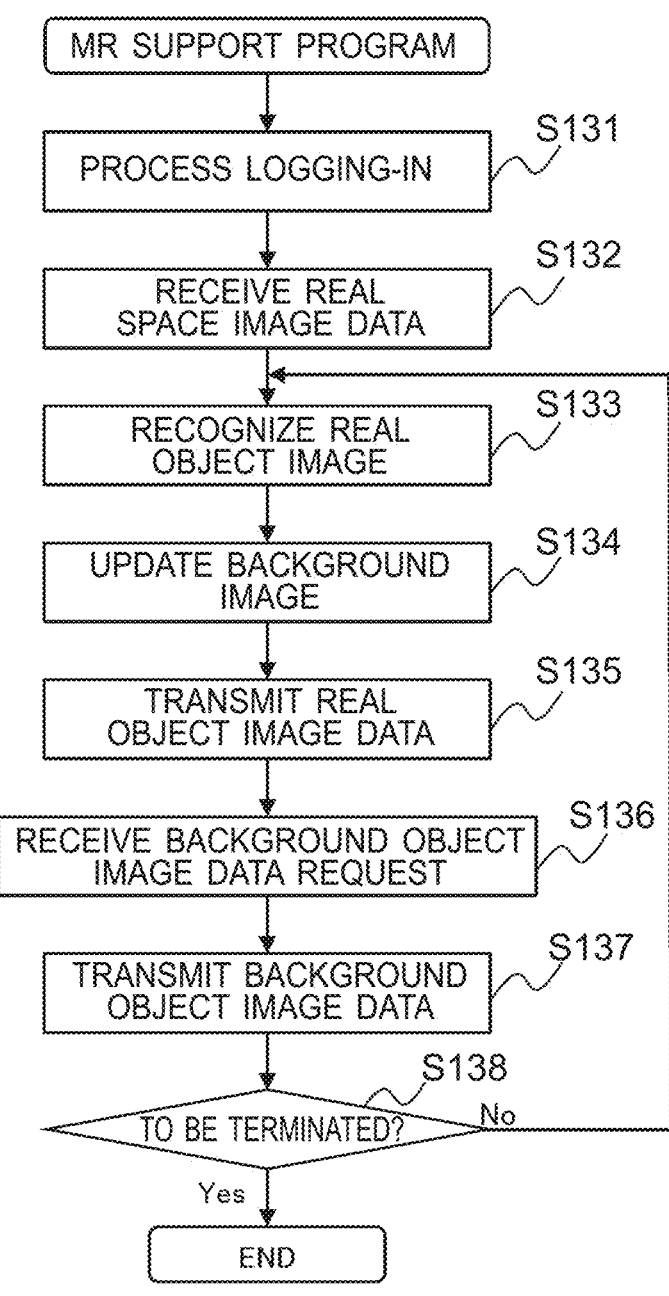
FIG. 9 illustrates a flowchart of an MR support server according to the first embodiment.

FIG. 9 illustrates a flowchart of the MR support program 96.

The MR support server 9 processes the log-in request from the registered MR experiencing person 2 (step S131).

The MR support server 9 receives the real space image data from the HMD 2a (step S132), recognizes the real object image (step S133), extracts the real object image data, and obtains the background image. The MR support server 9 updates the background image each time it receives a real space image (step S134).

The MR support server 9 transmits the real object image data to the HMD 2a (step S135). Upon receiving the request to transmit the background object image (step S136), the MR support server 9 transmits the background object image data to the HMD 2a (step S137).

The MR support server 9 continues the processes from steps S132 to S137 until a termination condition of the MR support program 96, for example, logging-out by the MR experiencing person 2 or termination of the MR experience program 251, is satisfied (step S138: No).

Upon satisfaction of the termination condition of the MR support program 96 (step S138: Yes), the MR support server 9 ends the series of processes.

According to the present embodiment, in the case where the real object and the 3D AR object 6 overlap each other on the same line of sight of an MR experiencing person, when the real object and the 3D AR object 6 are so far from each other that the volumes thereof do not overlap each other, the occlusion is performed while, when the real object and the 3D AR object 6 are so close to each other that they overlap each other, the overlapping elimination processing is performed without occlusion. This can prevent the real object and the 3D AR object 6 from being displayed with unnaturally overlapping each other, and thus can realize enhancement of the immersive experience of MR.

Furthermore, according to the present embodiment, even in an open space including a third party (MR non-experiencing person) who does not experience the MR, presence of the third party does not impair the shape of the 3D AR object 6. This enables the MR experiencing person to accurately recognize the 3D AR object 6 and experience the MR.

Second Embodiment

Figure 10A:
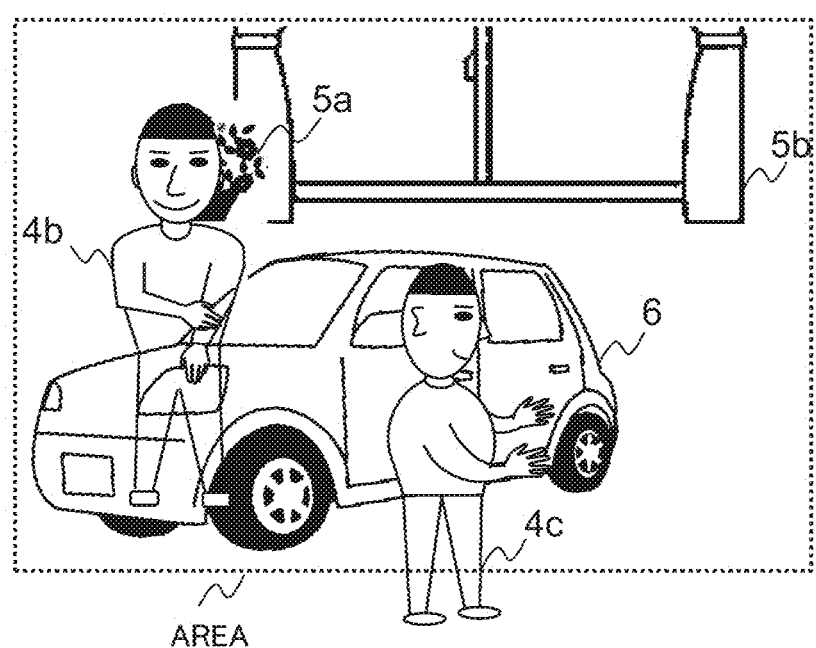
FIG. 10A illustrates an example of conventional 3D virtual reality display (illustrating a state in which a real object is in front of a 3D AR object).
Figure 10B:
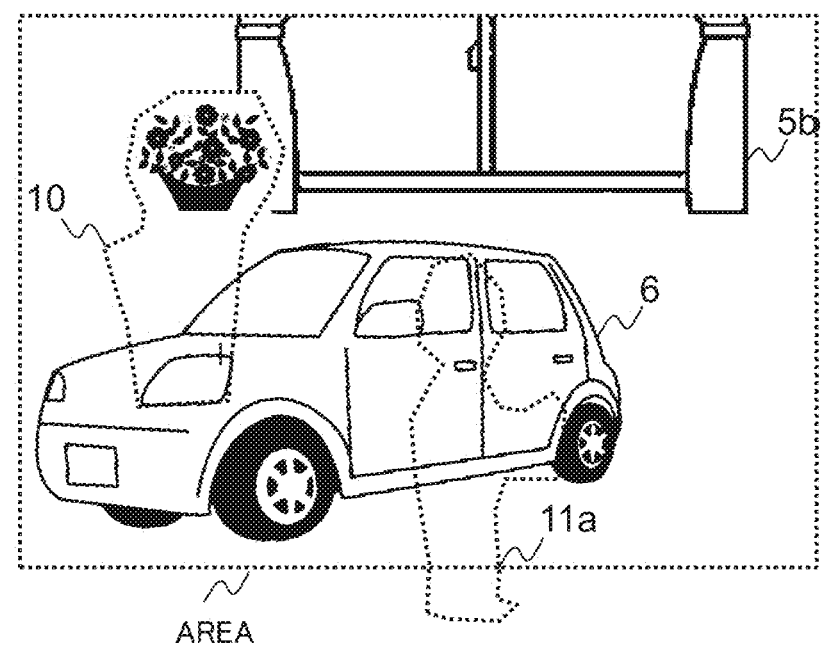
FIG. 10B illustrates 3D virtual reality display (example of fourth overlapping elimination display) according to a second embodiment.

A second embodiment of the present invention will be described with reference to FIG. 10A, FIG. 10B, and FIG. 11. FIG. 10A illustrates the conventional 3D virtual reality display (illustrating a state in which a real object is in front of the 3D AR object 6). FIG. 10B illustrates the 3D virtual reality display (fourth overlapping elimination display) according to the second embodiment.

As illustrated in FIG. 10A, the MR non-experiencing person 4b that is a real object and the 3D AR object 6 are at almost the same positions at the same distance. In addition, another MR non-experiencing person 4c that is a real object is in front of the 3D AR object 6. Both of them overlap the 3D AR object 6 from the line of sight of the HMD 2a, and thus hinder the observation of the 3D AR object 6.

In FIG. 10B, in the same manner as the first embodiment, the MR non-experiencing person 4b behind the 3D AR object 6 is replaced with the background object image 10. On the other hand, the other MR non-experiencing person 4c is deleted such that the 3D AR object 6 is arranged. Furthermore, within an area where the MR non-experiencing person 4c has been deleted, in a remaining area where the 3D AR object 6 does not overlap, a foreground image, which has been generated by extracting an image corresponding to the remaining area from the images of the overall view in other frames is embedded. The 3D AR object 6 and the background object image 10 correspond to the MR non-experiencing person 4b, and the 3D AR object 6 and a foreground image 11a correspond to the other MR non-experiencing person 4c. Using the background object image 10, the foreground image 11a, and the 3D AR object 6, the processing of overwriting and hiding the real object images of the MR non-experiencing person 4b and other MR non-experiencing person 4c is performed (example of fourth overlapping elimination display). This enables the entire 3D AR object 6 to be observed.

Figure 11:
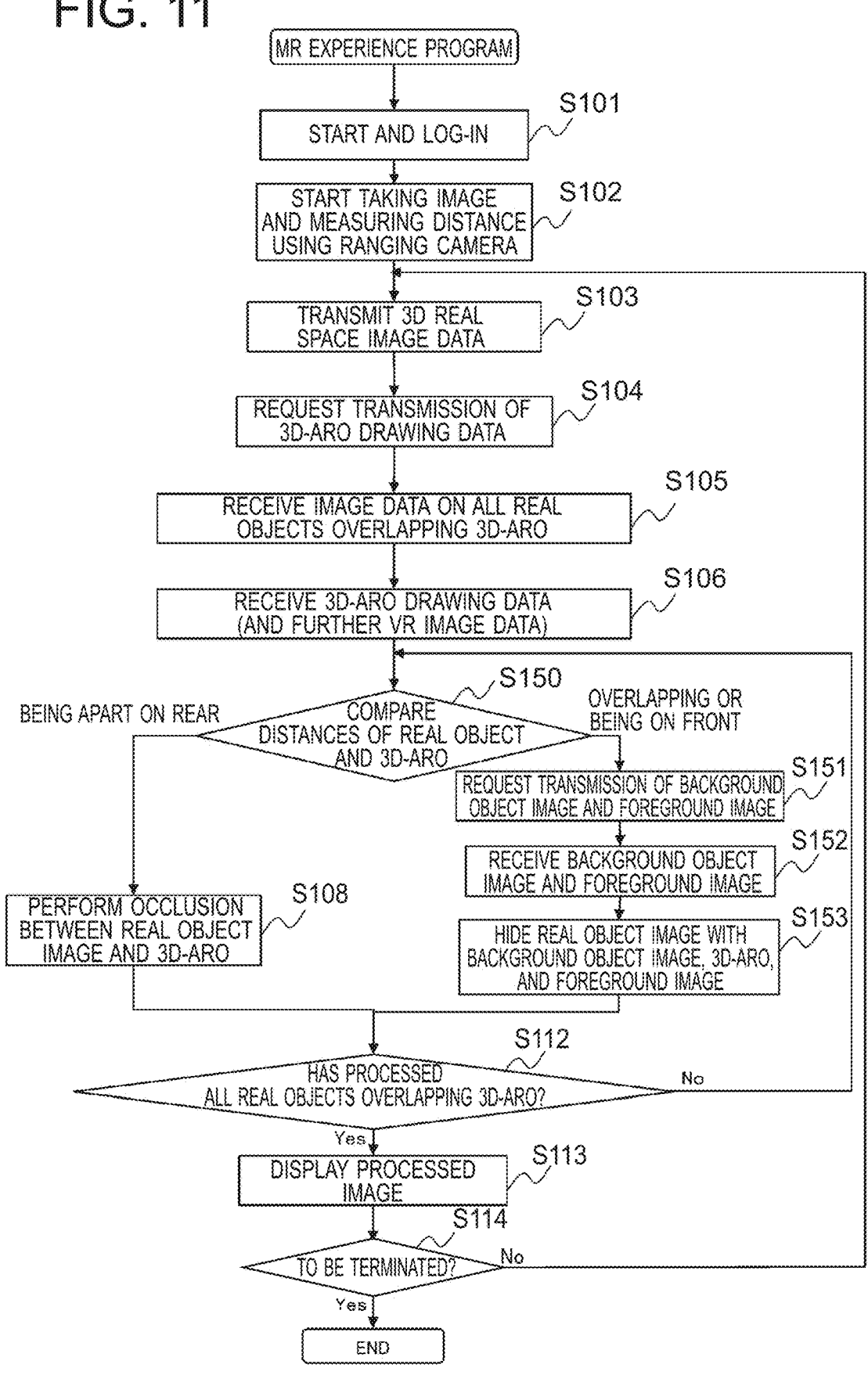
FIG. 11 illustrates a flowchart of an MR experience program according to the second embodiment.

FIG. 11 illustrates a flowchart of the MR experience program 251 according to the second embodiment.

The flowchart illustrated in FIG. 11 is different from the flowchart illustrated in FIG. 7 in distance comparison in step S150.

In step S150, whether the distance between a real object and the 3D AR object 6 falls within a case of "being on rear and apart" or a case of "being close or on front" is determined, and in the former case, occlusion is performed between the real object and the 3D AR object 6 (step S108), and in the latter case, a request to transmit the background object image and the foreground image is made (step S151) to receive the data (step S152). Then, the real object image is hidden with the background object image, the 3D AR object 6, and the foreground image (step S153). In the example above, the processing of displaying as if the MR non-experiencing person 4b and the other non-experiencing person 4c were not there is performed.

As described above, according to the second embodiment, the same features as those of the first embodiment are provided, and also, even if a real object is in front of the 3D AR object 6, it is possible to remove the real object that interferes observation of the 3D AR object 6.

Third Embodiment

With reference to FIG. 12A to FIG. 15B, a third embodiment will be described.

Figure 12A:
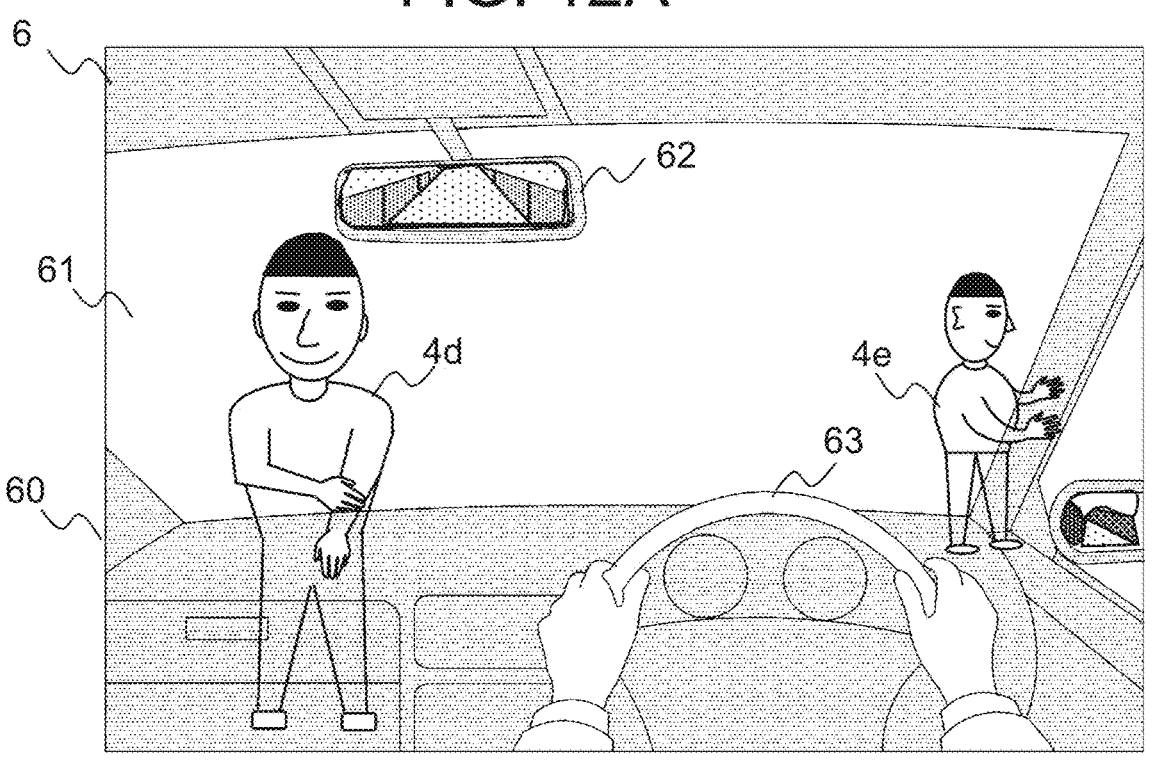
FIG. 12A illustrates an example of conventional 3D virtual reality display (illustrating a state in which a 3D AR object and a real object are overlapping each other).
Figure 12B:
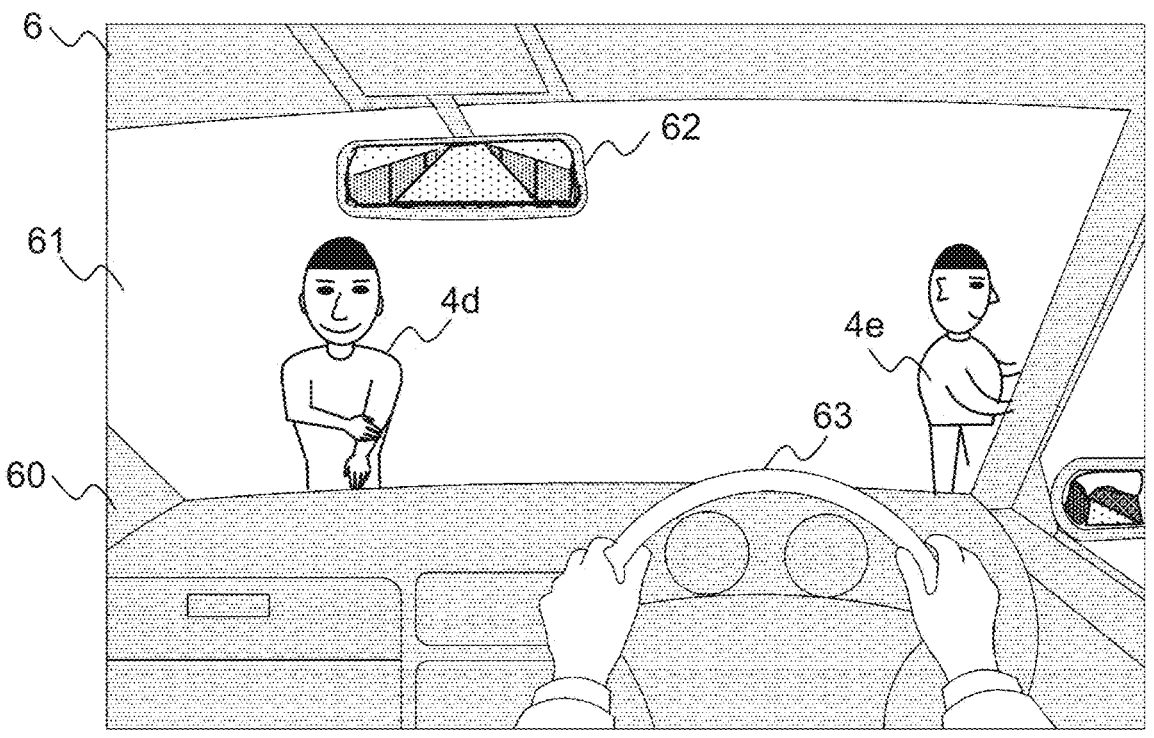
FIG. 12B illustrates an example of 3D virtual reality display (example of processing a transparent part) according to a third embodiment.
Figure 12C:
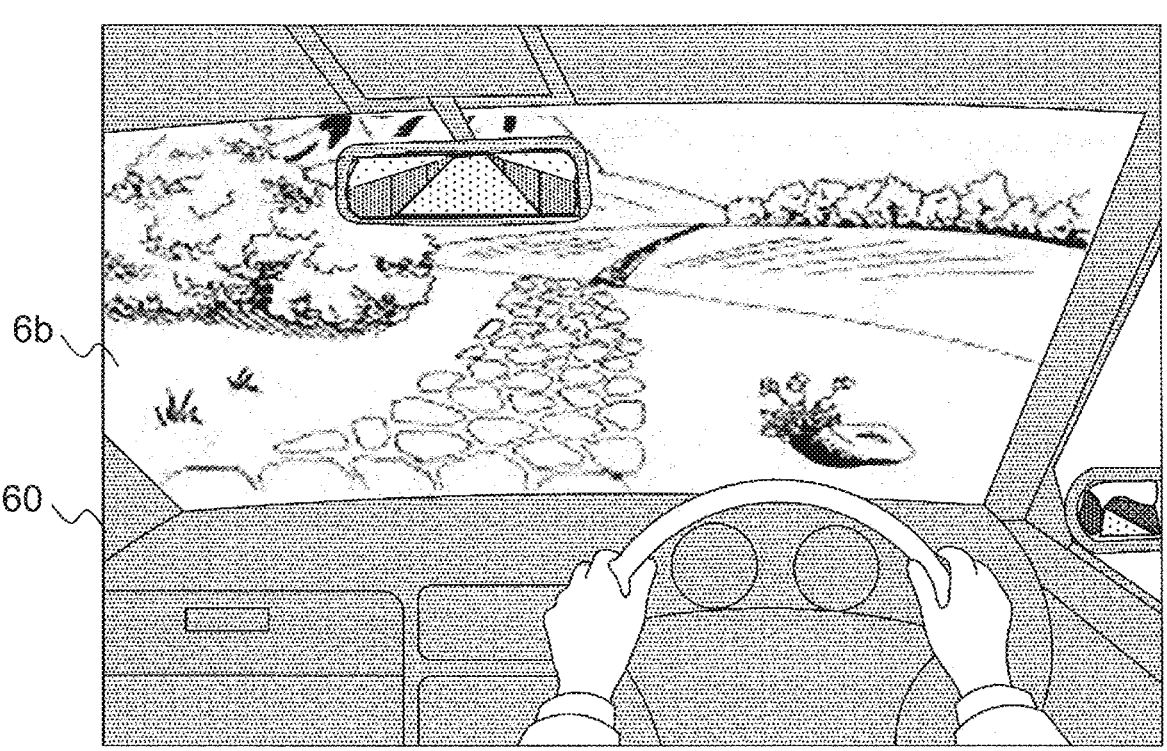
FIG. 12C illustrates an example of 3D virtual reality display (example of replacement with a VR image) according to the third embodiment.

FIG. 12A illustrates the conventional 3D virtual reality display (illustrating a state in which the 3D AR objects and the real object are overlapping each other). FIG. 12B illustrates an example of the 3D virtual reality display according to a third embodiment (example of processing a transparent part). FIG. 12C illustrates an example of the 3D virtual reality display according to the third embodiment (example of replacement with a VR image). In FIG. 12A to FIG. 12C, the MR experiencing person 2 is experiencing a situation as if he or she was sitting in a driver's seat. As the 3D AR objects, a dashboard 60, a front window 61, a rearview mirror 62, a steering wheel 63, and the like are being displayed. The MR non-experiencing persons 4d, 4e (real objects) overlap the front window 61 and are visible through the front window 61. The dashboard 60, the front window 61, the rearview mirror 62, and the steering wheel 63 are components of the 3D AR object 6 of a car. In the present embodiment, the 3D AR object 6, which is one virtual reality object, is divided into a plurality of parts of the virtual reality object, and a flag for defining the type of occlusion is added to each of the parts. Each of the dashboard 60, the rearview mirror 62, and the handle 63, which is a non-transparent area of the 3D AR object 6, is provided with a non-transparent area flag. On the other hand, the front window 61, which is a transparent area of the 3D AR object 6, is provided with a transparent area flag.

In FIG. 12A, occlusion has not been performed, and thus the MR non-experiencing persons 4*d*, 4*e* appear unnaturally overlapping the 3D AR object 6.

FIG. 12B illustrates the state after occlusion has been performed. In the third embodiment, an Occlusion Flag which will be described in FIG. 13 is set for the drawing data on the 3D AR object 6 of the front window 61, and thus the processing of replacing the real object overlapping the front window 61 with the 3D AR object 6 is prohibited while occlusion is performed between the real object and the 3D AR object 6. This allows the MR non-experiencing persons 4*d*, 4*e* to be observed through the front window 61. At this time, in the case where, due to the short distance between the MR non-experiencing person 401 and the 3D AR object 6, the MR non-experiencing person 4*d* displayed behind the front window 61 appears in the same way as the MR non-experiencing person 4*b* (real object) in FIG. 6A, reducing the size of the MR non-experiencing person 4*d* (real object) enables the MR non-experiencing person 4*d* to be appeared as if it was at a distant like the MR non-experiencing person 4*d* illustrated in FIG. 12B. Note that the MR non-experiencing person 4*e* is farther than the dashboard (3D AR object) 60, the steering wheel 63 (3D AR object), and also the 3D AR object 6 that is the vehicle body, and thus is processed with occlusion based on the relation of distances to the components above other than the front window 61 which is treated as being transparent.

FIG. 12C illustrates the case where the background image of the real space is replaced with a VR image 6*b*. The dashboard 60, the steering wheel 63, and the VR image 6*b* are processed by occlusion. On the other hand, the front window 61 is a transparent or semi-transparent 3D AR object through which the VR image 6*b* at the back of the line of sight can be observed. This can realize an experience as if an experiencing person was in a virtual location provided by the VR image.

FIG. 13 illustrates an exemplary table 100 of the 3D AR objects. The 3D AR objects are identified by a "CONTENTS ID", and a plurality of 3D AR objects (such as AR Object 1 to 7) can be grouped together as being related to each other. Each of the 3D AR objects includes, in addition to a "Data id" specific to each of the 3D AR objects, and a "Title" for helping users such as MR experiencing persons to grasp them, the "Occlusion Flag" and "3D image Data".

The "Occlusion Flag" defines "00", "01", and "10". When the value of the "Occlusion Flag" is "00", occlusion is performed in accordance with the distances of the real object and 3D AR object. A flag with the "Occlusion Flag" of "00" corresponds to a non-transparent part flag.

When the value of the "Occlusion Flag" is "01" and in the case of the close distance between the real object and the 3D AR object, the processing of replacing the real object with the background object is performed so as to prevent the 3D AR object from being hidden. A flag with the "Occlusion Flag" of "01" corresponds to a non-transparent part flag.

When the value of the "Occlusion Flag" is "10", as in the case of the front window 61 illustrated in FIG. 12B, the 3D AR object is treated as being transparent regardless of the distance, and occlusion is performed between the 3D AR object ahead of the front window 61 and the real object. A flag with the "Occlusion Flag" of "10" corresponds to a transparent part flag. The 3D AR object ahead of the front window 61 may be a portion of the 3D AR object 6 of the car such as a hood, or may be another 3D AR object different from the 3D AR object 6 of the car such as a 3D AR object of another car.

Figure 14:
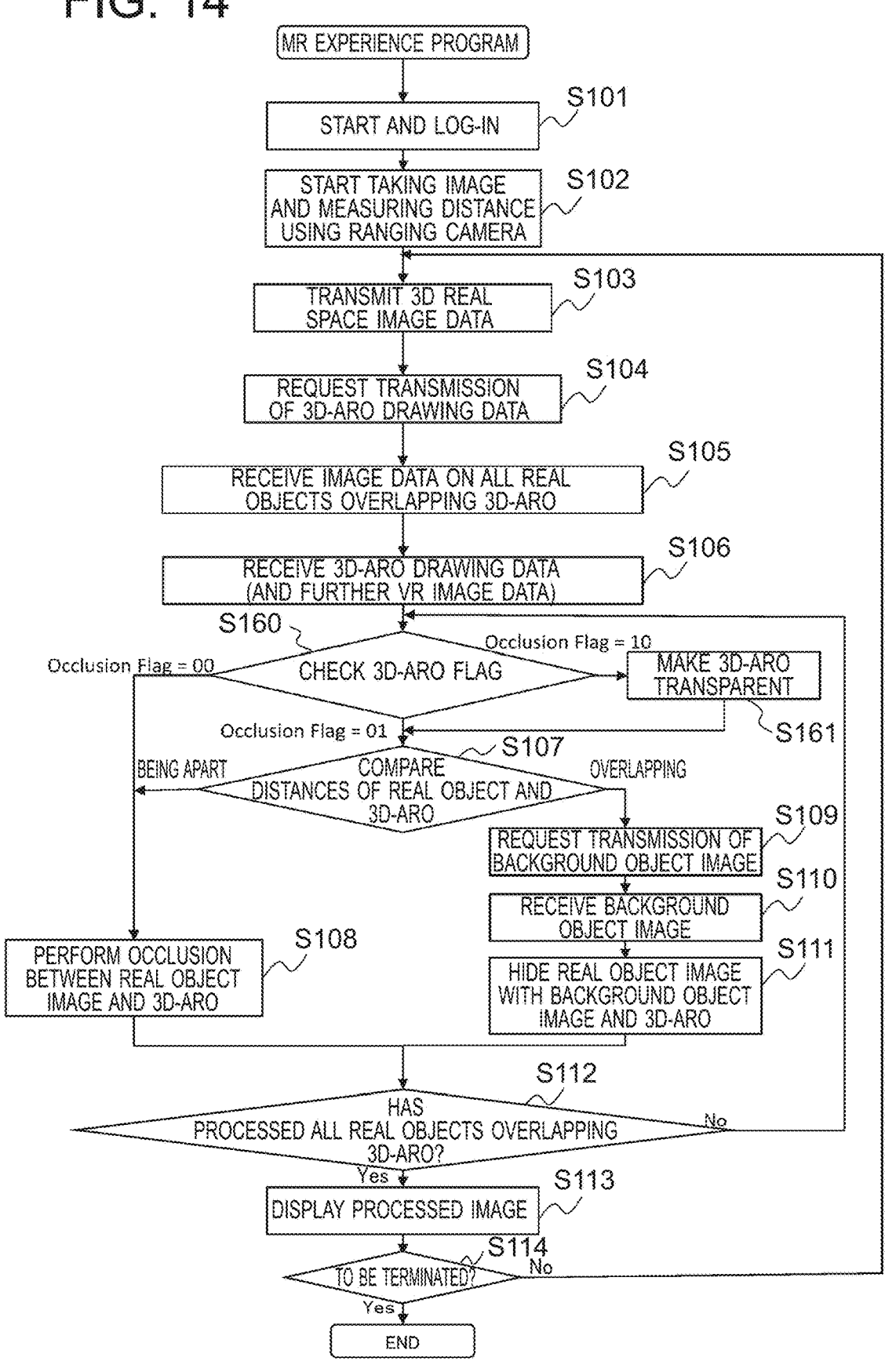
FIG. 14 illustrates a flowchart of an MR experience program according to the third embodiment.

FIG. 14 illustrates a flowchart of the MR experience program 251 according to the third embodiment.

The flowchart illustrated in FIG. 14 is different from the flowchart illustrated in FIG. 7 in steps S160 and S161 which have been added.

In step S160, the HMD 2*a* checks the "Occlusion Flag" of the 3D AR object, so as to, as described with reference to FIG. 13, make the processing differ depending on the values of the "Occlusion Flag".

In the case of the "Occlusion Flag" of "00", the HMD 2*a* performs occlusion in accordance with the relation of the distances of the real object and 3D AR object in step S108. (This processing will be described with reference to FIG. 15.)

In the case of the "Occlusion Flag" of "10", in step S161, the HMD 2*a* treats the AR object as a transparent object like the front window 61 illustrated in FIG. 12, and performs the processing of making the AR object appear transparent even if it is closer than the real object. Thereafter, the processing enters step S107.

In the case of the "Occlusion Flag" of "01", the HMD 2*a* compares the distances of the real object and 3D AR object in step S107, and makes the processing different between the case of being apart and the case being close or overlapping.

Figure 15:
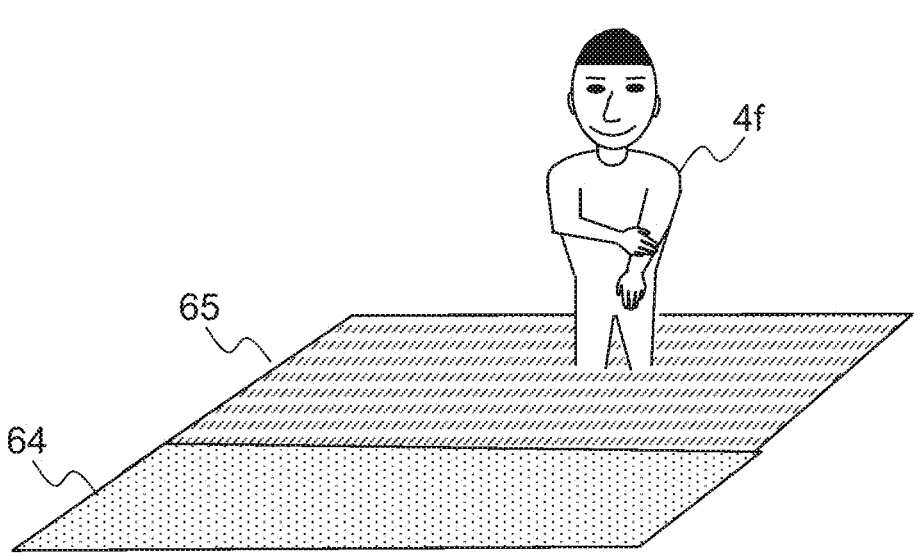
FIG. 15 illustrates another example of 3D virtual reality display according to the third embodiment.

FIG. 15 illustrates an exemplary image in the case of the "Occlusion Flag" of "00". FIG. 15 illustrates a situation in which a real object 4*f* is playing at the seaside (including 3D AR objects of a sand beach 64 and sea surface 65). In FIG. 15, the "Occlusion Flag" of the sea surface 65 is set to "00". A person who is the real object 4*f* is appearing only by half from the sea surface 65, but this does not cause unnaturalness. Accordingly, occlusion may be performed based on the relation of the distances of the sea surface 65 and real object 4*f*.

As described above, according to the third embodiment, the same features as those of the first embodiment are provided, and also, it is possible to apply occlusion in accordance with the characteristics of 3D AR objects.

Fourth Embodiment

Figure 16:
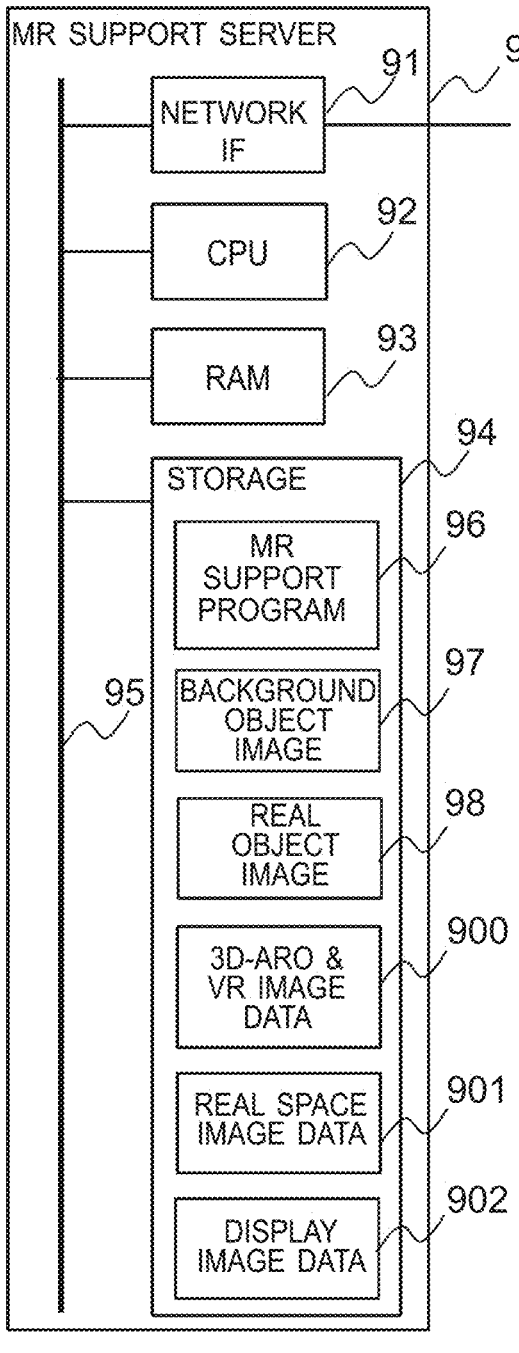
FIG. 16 is a block diagram of an MR support server according to a fourth embodiment.

With reference to FIG. 16 and FIG. 17A, a fourth embodiment will be described. FIG. 16 is a block diagram of the MR support server 9 according to the fourth embodiment. The MR support server 9 according to the fourth embodiment holds 3D AR object & VR image data 900, real space image data 901, and display image data 902 in the storage 94.

Based on an instruction from the HMD 2*a*, the MR support server 9 according to the fourth embodiment holds the 3D AR object & VR image data 900 received from the VR service server 8 and the real space image data 901 received from the HMD 2*a*.

Furthermore, the MR support server 9 recognizes and extracts an object located, in the depth direction on the line of sight, on the deeper side (farther side) from the real object image 98 as a background object from the real space image data 901, so as to generate the background object image 97.

Still further, the MR support server 9 performs occlusion and the like between the real object image 98 and the 3D AR object & VR image data 900 to obtain the display image data 902 obtained by compositing the data above with the real space image. The MR support server 9 transmits the display image data 902 to the HMD 2*a*, and the HMD 2*a* displays the display image data 902 on the display 22. In the case of receiving the VR image data about the background together with the image data about the 3D AR object, the MR support server 9 stores it in the 3D AR object & VR image data 900.

The MR support server 9 includes a program for replacing the background image within the real object with the VR image data, performing occlusion for the VR image of the background, the 3D AR object, and the real object, and performing composition such as moving the real object.

Figure 17:
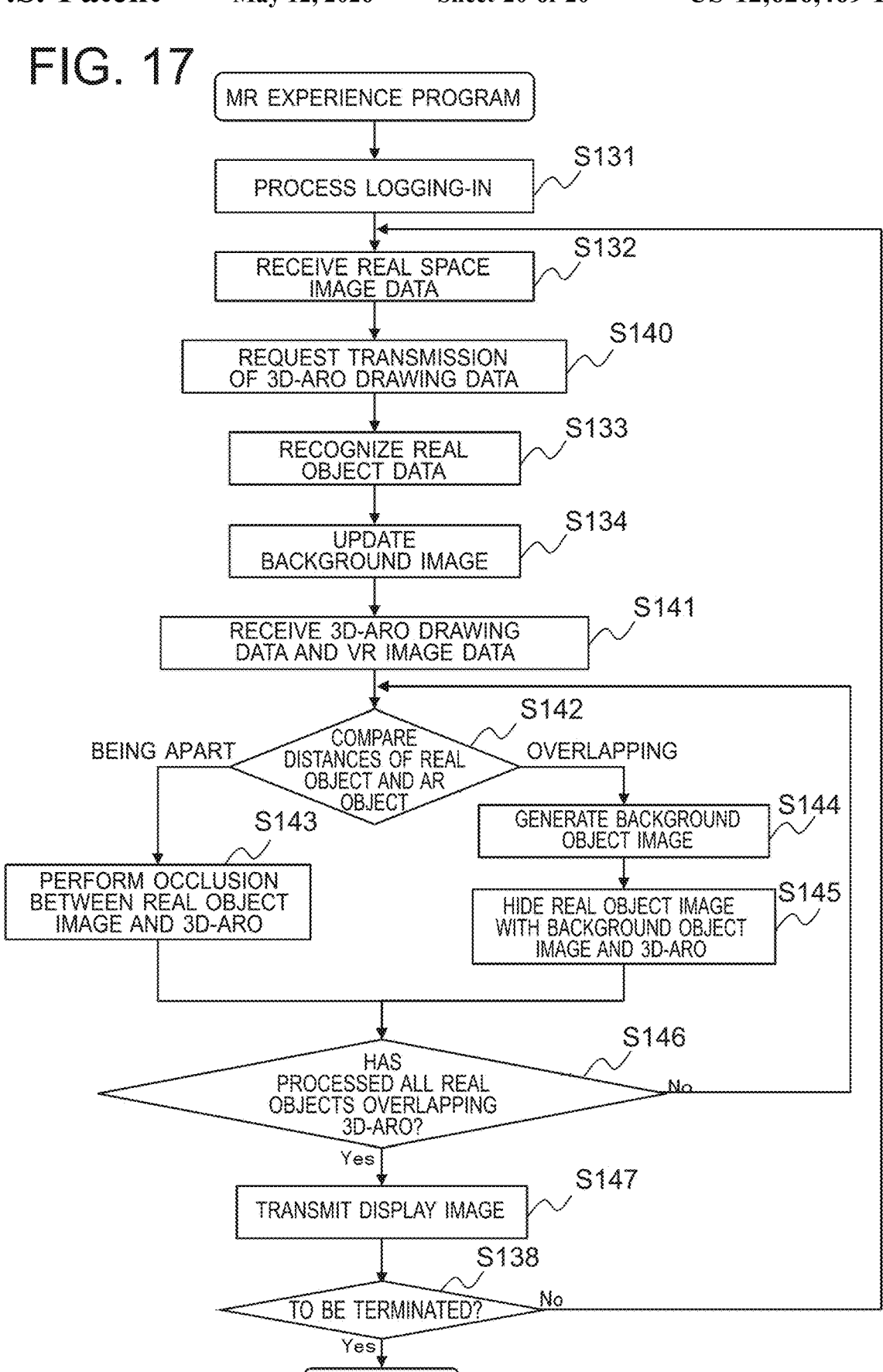
FIG. 17 illustrates a flowchart of 3D virtual reality display processing according to the fourth embodiment.

FIG. 17 illustrates a flowchart of the MR support program 96 according to the fourth embodiment.

The MR support server 9 processes the log-in request from the registered MR experiencing person 2 (step S131). Furthermore, the MR support server 9 receives the real space image data from the HMD 2*a* (step S132).

The MR support server 9 transmits, to the VR service server, the request to transmit the drawing data on the 3D AR object (step S140). For a 3D AR object to be requested, a user of the HMD 2*a* decides which AR content to be composited, and the MR support server 9 receives an instruction to transmit the drawing data about the 3D AR object based on the decision above.

The MR support server 9 recognizes the real object from the real space image data received in step S132 (step S133), and updates the background image based on the real space image data as received (step S134).

The MR support server 9 receives the drawing data about the 3D AR object and the VR image (may not receive the VR image) data (step S141).

The MR support server 9 detects the overlapping between the real object and the 3D AR object, and also compares the distances of the two objects (step S142). When they are so apart that the volumes thereof are not overlapping each other (step S142: being apart), the MR support server 9 performs occlusion between the real object and the 3D AR object (step S143).

On the other hand, when they are overlapping each other (step S142: overlapping), the MR support server 9 generates the data on the background object image based on the background image (step S144), and performs the processing for overwriting and hiding the real object with the background object image and the 3D AR object (step S145).

The MR support server 9 confirms whether the processes in steps from S142 to S145 have been executed for all the real objects overlapping the 3D AR object, and returns to step S142 if any real object remains unprocessed (step S146: No).

Upon completion of processes for all the real objects (step S146: Yes), the MR support server 9 transmits the processed images to the HMD 2*a* as the display image data (step S147).

The MR support server 9 confirms whether the program is to be terminated if the program is not to be terminated (step S138: No), the MR support server 9 continues the steps from step S142. If the program is to be terminated (step S138: Yes), the MR support server 9 ends the series of processes.

According to the fourth embodiment, the same features as those of the first embodiment are provided, and also, it is possible to make the implementation flexible by, for example, realizing execution of the most of the MR experience processing by the high-performance MR support server 9 so as to reduce the processing load on the HMD 2*a*.

It should be noted that the present invention is not limited to the embodiments illustrated in FIG. 1 to FIG. 17, but allows a part of the configuration of one embodiment to be replaced with a part of other embodiments. Furthermore, configurations of other embodiments may be added to configurations of a certain embodiment. All of these are included in the scope of the present invention. The numerical values and messages appearing in the text and drawings are merely examples, and thus the advantageous effects of the present invention are not impaired even if different ones are used.

It should be also noted that some or all of the functions and the like of the invention may be implemented by hardware, for example, by designing them by an integrated circuit. Furthermore, a microprocessor unit, a CPU, or the like may interpret and execute an operation program, thereby causing them to be implemented by software. Still further, the implementation range of the software is not limited, and hardware and software may be used in combination.

REFERENCE SIGNS LIST

1: MR space
1*a*: access point
1*b*: wireless LAN signal
2, 3: MR experiencing person
2*a*, 3*a*: HMD
2*b*, 3*b*: wireless LAN signal
4*a*, 4*b*, 4*c*, 4*d*, 4*e*: MR non-experiencing person
4*f*: real object
5*a*: vase
5*b*: window
6: 3D AR object
6*a*: VR image data
6*b*: VR image
7: network
8: VR service server
9: MR support server
10: background object image
11: image
11*a*: foreground image
20: ranging camera
20*a*: left camera
20*b*: right camera
22: display
23: shutter
24: processor
25*a*, 25*b*: wearing housing
26: speaker
27: microphone
60: dashboard
61: front window
62: rearview mirror
63: steering wheel
64: sand beach
65: sea surface
82: CPU
83: RAM
84: storage
85: internal bus
86: VR service program
87: VR data
91: network IF
92: CPU
93: RAM
94: storage
95: internal bus
96: MR support program
97, 98: background object image

100: table
240: camera processor
241: orientation sensor
242: gyro sensor
243: acceleration sensor
244: wireless communication unit
245: CPU
246: PAM
247: image RAM
249: internal bus
250: basic program
251: MR experience program
900: 3D AR object & VR image data
901: real space image data
902: display image data
L: line of sight
PR: intersection point
Pn: farthest point
P1: closest point
The invention claimed is:

1. A 3D virtual reality display device, comprising:
a camera that takes an image of a real space and outputs a real object image of a real object included in the real space;
a distance sensor that measures a distance from an observer of the real space to the real object;
a display; and
a processor that displays a 3D virtual reality object on the display;
wherein the processor is configured to:
when the real object is on a line of sight of the observer who is observing the 3D virtual reality object, compare a distance from the observer to a position at which the 3D virtual reality object is being displayed with a distance from the observer to the real object; and
when the real object is overlapping the 3D virtual reality object in accordance with a result comparing the distance from the observer to the position at which the 3D virtual reality object is being displayed with the distance from the observer to the real object, perform overlapping elimination display processing of displaying the 3D virtual reality object on the line of sight while not displaying the real object image on the line of sight; and
when the real object is present at a same distance as or in front of a farthest point in a depth direction along the line of sight among points forming the 3D virtual reality object, the processor determines that the real object is overlapping the 3D virtual reality object; and
when the real object is present at the same distance as or in front of the farthest point, the processor deletes the real object image from the 3D real space image obtained by taking an image of the real space using the camera and inserts and displays a background object image generated based on the 3D real space image in an area where the real object image has been deleted.

2. The 3D virtual reality display device according to claim 1, wherein
when the real object is located farther than the farthest point on the line of sight, the processor executes occlusion processing to display the real object image behind the 3D virtual reality object.

3. The 3D virtual reality display device according to claim 1, wherein the processor moves the real object image which has been deleted to display the real object image on a position off from the line of sight in the 3D real space image.

4. The 3D virtual reality display device according to claim 1, wherein
when the real object is located at the same distance as or in front of the farthest point, the processor superimposes and displays the 3D virtual reality object on a 3D virtual space image prepared in advance.

5. The 3D virtual reality display device according to claim 1, wherein
when the real object is present at a same distance as or further in front of a closest point nearest in the depth direction along the line of sight among the points forming the 3D virtual reality object, the processor deletes the real object image from a 3D real space image obtained by taking an image of the real space using the camera, superimposes the 3D virtual reality object on the 3D real space image from which the real object has been deleted, and also inserts and displays a foreground image generated based on the 3D real space image in a remaining area where the real object image has been deleted from the 3D real space image.

6. The 3D virtual reality display device according to claim 1, wherein
the 3D virtual reality object is provided with a flag for controlling occlusion processing for the 3D virtual reality object, and
the processor controls execution of processing such as the occlusion processing between the 3D virtual reality object and the real object image in accordance with the flag.

7. The 3D virtual reality display device according to claim 6, wherein
the 3D virtual reality object includes a non-transparent area and a transparent area,
the flag includes a non-transparent area flag to be provided to the non-transparent area and a transparent area flag to be provided to the transparent area, and
the processor is configured to:
for a part of the 3D virtual reality object to which the non-transparent area flag is added, perform the overlapping elimination display processing; and
for a transparent area of the 3D virtual reality object to which the transparent area flag is added, regardless of distances of the transparent area and real object, when another part of the 3D virtual reality object or another 3D virtual reality object and the real object are on the line of sight transparently observing the real object through the transparent area, display the other part of the 3D virtual reality object or the other 3D virtual reality object and the real object in accordance with distances thereto, or display the real object in accordance with a distance to the real object when only the real object is on the line of sight.

8. A head-mounted display equipped with the 3D virtual reality display device according to claim 1.

9. A 3D virtual reality display method, the method comprising:
acquiring 3D real space image data obtained by adding a distance from an observer of a real space to a real object included in the real space to a 3D real space image generated by taking an image of the real space;
determining whether the real object is present on a line of sight of the observer who is observing a 3D virtual reality object;

in response to the real object being present on the line of sight of the observer who is observing a 3D virtual reality object, comparing a distance from the observer to a position at which the 3D virtual reality object is being displayed and a distance from the observer to the real object which is based on the 3D real space image data; and in response to the real object overlapping the 3D virtual reality object in accordance with a result comparing the distance from the observer to the position at which the 3D virtual reality object is being displayed with the distance from the observer to the real object, performing overlapping elimination display processing of displaying the 3D virtual reality object on the line of sight while not displaying the real object image on the line of sight; and in response to the real object being present at the same distance as or in front of a farthest point in a depth direction along the line of sight among points forming the 3D virtual reality object, the processor determines that the real object is overlapping the 3D virtual reality object; and in response to the real object being present at the same distance as or in front of the farthest point, the processor deletes the real object image from the 3D real space image obtained by taking an image of the real space using the camera and inserts and displays a background object image generated based on the 3D real space image in an area where the real object image has been deleted.

10. A 3D virtual reality display processor, comprising: circuitry configured to:

when a real object in a real space in a real object image output from a camera is on a line of sight of an observer who is observing a 3D virtual reality object on a display, compare a distance from the observer to a position at which the 3D virtual reality object is being displayed with a distance from the observer to the real object; and when the real object is overlapping the 3D virtual reality object in accordance with a result comparing the distance from the observer to the position at which the 3D virtual reality object is being displayed with the distance from the observer to the real object, perform overlapping elimination display processing of displaying the 3D virtual reality object on the line of sight; and when the real object is present at a same distance as or in front of a farthest point in a depth direction along the line of sight among points forming the 3D virtual reality object, the processor determines that the real object is overlapping the 3D virtual reality object; and when the real object is present at the same distance as or in front of the farthest point, the processor deletes the real object image from the 3D real space image obtained by taking an image of the real space using the camera and inserts and displays a background object image generated based on the 3D real space image in an area where the real object image has been deleted.

11. The 3D virtual reality display processor according to claim 10, wherein when the real object is located farther than the farthest point on the line of sight, the processor executes occlusion processing to display the real object image behind the 3D virtual reality object.

12. The 3D virtual reality display processor according to claim 10, wherein when the real object is located at the same distance as or in front of the farthest point, the processor superimposes and displays the 3D virtual reality object on a 3D virtual space image prepared in advance.

13. The 3D virtual reality display processor according to claim 10, wherein when the real object is present at a same distance as or further in front of a closest point nearest in the depth direction along the line of sight among the points forming the 3D virtual reality object, the processor deletes the real object image from a 3D real space image obtained by taking an image of the real space using the camera, superimposes the 3D virtual reality object on the 3D real space image from which the real object has been deleted, and also inserts and displays a foreground image generated based on the 3D real space image in a remaining area where the real object image has been deleted from the 3D real space image.

14. The 3D virtual reality display processor according to claim 10, wherein the 3D virtual reality object is provided with a flag for controlling occlusion processing for the 3D virtual reality object, and the processor controls execution of processing such as the occlusion processing between the 3D virtual reality object and the real object image in accordance with the flag.

15. The 3D virtual reality display processor according to claim 14, wherein the 3D virtual reality object includes a non-transparent area and a transparent area, the flag includes a non-transparent area flag to be provided to the non-transparent area and a transparent area flag to be provided to the transparent area, and the processor is configured to:

for a part of the 3D virtual reality object to which the non-transparent area flag is added, perform the overlapping elimination display processing; and for a transparent area of the 3D virtual reality object to which the transparent area flag is added, regardless of distances of the transparent area and real object, when another part of the 3D virtual reality object or another 3D virtual reality object and the real object are on the line of sight transparently observing the real object through the transparent area, display the other part of the 3D virtual reality object or the other 3D virtual reality object and the real object in accordance with distances thereto, or display the real object in accordance with a distance to the real object when only the real object is on the line of sight.

16. A head-mounted display equipped with the 3D virtual reality display processor according to claim 10.

* * * * *